United States Patent
Hubis et al.

(10) Patent No.: US 6,343,324 B1
(45) Date of Patent: Jan. 29, 2002

(54) METHOD AND SYSTEM FOR CONTROLLING ACCESS SHARE STORAGE DEVICES IN A NETWORK ENVIRONMENT BY CONFIGURING HOST-TO-VOLUME MAPPING DATA STRUCTURES IN THE CONTROLLER MEMORY FOR GRANTING AND DENYING ACCESS TO THE DEVICES

(75) Inventors: Walter A. Hubis, Louisville; William G. Deitz, Niwot, both of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,220

(22) Filed: Sep. 13, 1999

(51) Int. Cl.$^7$ ............................ G06F 15/16; G06F 13/10
(52) U.S. Cl. ......................... 709/229; 711/111; 711/221
(58) Field of Search ................................ 709/229, 212, 709/249, 251, 226; 711/112, 114, 206, 111, 207, 220, 221; 714/1, 10, 11, 12, 6; 710/200, 107, 36; 713/150, 151, 200, 201

(56) References Cited

U.S. PATENT DOCUMENTS

| | | | | |
|---|---|---|---|---|
| 3,757,225 A | * | 9/1973 | Ulicki ............................ | 725/1 |
| 4,207,609 A | * | 6/1980 | Luiz et al. ...................... | 710/38 |
| 4,837,680 A | * | 6/1989 | Crockett et al. ............. | 710/104 |
| 4,970,640 A | * | 11/1990 | Beardsley et al. .......... | 707/104 |
| 5,222,217 A | * | 6/1993 | Blount et al. ................ | 707/204 |
| 5,301,290 A | * | 4/1994 | Telzlaff et al. .............. | 711/142 |
| 5,339,427 A | * | 8/1994 | Elko et al. ................... | 709/103 |
| 5,410,697 A | * | 4/1995 | Baird et al. .................. | 711/152 |
| 5,428,796 A | * | 6/1995 | Iskiyan et al. ............... | 710/240 |
| 5,655,146 A | * | 8/1997 | Baum et al. ..................... | 707/5 |
| 5,692,128 A | * | 11/1997 | Bolles et al. ................ | 709/224 |
| 5,761,669 A | * | 6/1998 | Montague et al. .......... | 707/103 |
| 5,768,623 A | * | 6/1998 | Judd et al. ..................... | 710/37 |
| 5,802,178 A | * | 9/1998 | Holden et al. ............... | 713/151 |
| 5,915,088 A | * | 6/1999 | Basavaiah et al. ..... | 395/200.28 |
| 5,933,824 A | * | 8/1999 | DeKoning et al. ............. | 707/8 |

(List continued on next page.)

FOREIGN PATENT DOCUMENTS

| | | | | |
|---|---|---|---|---|
| EP | 682312 A2 | * | 5/1995 | ............. G06F/9/46 |
| JP | WO-93/23810 A1 | * | 11/1993 | ........... G06F/13/12 |

*Primary Examiner*—Le Hien Luu
*Assistant Examiner*—Bunjob Jaroenchonwanit
(74) *Attorney, Agent, or Firm*—Flehr Hohbach Test Albritton & Herbert LLP

(57) ABSTRACT

The invention provides structure and method for controlling access to a shared storage device, such as a disk drive storage array, in computer systems and networks having a plurality of host computers. A method for controlling access to a hardware device in a computer system having a plurality of computers and at least one hardware device connected to the plurality of computers. The method includes the steps of associating a locally unique identifier with each the plurality of computers, defining a data structure in a memory identifying which particular ones of the computers based on the locally unique identifier may be granted access to the device; and querying the data structure to determine if a requesting one of the computers should be granted access to the hardware device. In one embodiment, the procedure for defining the data structure in memory includes defining a host computer ID map data structure in the memory; defining a port mapping table data structure comprising a plurality of port mapping table entries in the memory; defining a host identifier list data structure in the memory; defining a volume permission table data structure in the memory; and defining a volume number table data structure in the memory. In one particular embodiment, the memory is a memory of a memory controller controlling the hardware device, and the hardware device is a logical volume of a storage subsystem. The invention also provides an inventive controller structure, and a computer program product implementing the inventive method.

38 Claims, 7 Drawing Sheets

U.S. PATENT DOCUMENTS

| | | | | |
|---|---|---|---|---|
| 5,940,591 | A | * 8/1999 | Boyle et al. | 713/201 |
| 5,940,828 | A | * 8/1999 | Anaya et al. | 707/8 |
| 5,956,723 | A | * 9/1999 | Zhu | 707/100 |
| 5,968,182 | A | * 10/1999 | Chen et al. | 714/5 |
| 5,999,930 | A | * 12/1999 | Wolff | 707/8 |
| 6,012,067 | A | * 1/2000 | Sarkar | 707/103 |
| 6,029,168 | A | * 2/2000 | Frey | 707/10 |
| 6,057,981 | A | * 5/2000 | Fish et al. | 360/97.01 |
| 6,061,753 | A | * 5/2000 | Ericson | 710/107 |
| 6,073,218 | A | * 6/2000 | DeKoning et al. | 711/150 |
| 6,148,414 | A | * 11/2000 | Brown et al. | 714/9 |
| 6,151,331 | A | * 11/2000 | Wilson | 370/465 |
| 6,154,714 | A | * 11/2000 | Feldman | 707/9 |
| 6,195,703 | B1 | * 2/2001 | Blumenau et al. | 709/238 |
| 6,029,023 | A1 | * 3/2001 | Dimitroff et al. | 709/211 |
| 6,209,023 | B1 | 3/2001 | Dimitroff et al. | |
| 6,212,636 | B1 | * 4/2001 | Boyle et al. | 713/168 |
| 6,233,618 | B1 | * 5/2001 | Shannon | 709/229 |
| 6,236,996 | B1 | * 5/2001 | Bapat et al. | 707/9 |

* cited by examiner

METHOD AND SYSTEM FOR CONTROLLING ACCESS SHARE STORAGE DEVICES IN A NETWORK ENVIRONMENT BY CONFIGURING HOST-TO-VOLUME MAPPING DATA STRUCTURES IN THE CONTROLLER MEMORY FOR GRANTING AND DENYING ACCESS TO THE DEVICES

FIELD OF THE INVENTION

This invention pertains generally to computer systems and networks having two or more host computers and at least one shared data storage device. More particularly, the invention pertains to structure and method for controlling access to shared storage in computer systems and networks having a plurality of host computers that may create data integrity issues for the shared data storage, particularly in a Storage Area Network (SAN).

BACKGROUND

Conventional operating systems may typically assume that any storage volume or device is "private" and not shared among different host computers. In a distributed computing system, such as a network server system, a disk drive, a storage volume, a logical volume, or other storage device may be shared and represent common storage. When a controller responsible for controlling read, write, or other access to the storage device, such as a hard disk array controller (for example a RAID controller) is attached to the plurality of host computers, such as through a SCSI Bus, Fibre Channel Loop, or other storage device interface, problems may arise because one or more of these plurality of host computers may overwrite or otherwise corrupt information needed for the correct operation of another different host computer system.

This problem is particular prevalent when the plurality of host computers is formed from a heterogeneous mixture or collection of different host computers having different operating systems, but this problem also exists for homogeneous mixtures or collections of host computer systems.

In one exemplary situation, one type of operating system (such as for example, the Unix operating system of a computer made by Sun Microsystems) requires special information at specific addresses on the storage device, while a different type of operating system (such as for example, a computer utilizing the Windows NT operating system made by Microsoft) may require that any attached storage have special identifying information written to the same or an overlapping address on the same storage device. The second type (Windows NT) will overwrite the information needed by the first type (Unix) of computer, and from the perspective of the Unix computer, the storage will be corrupt and unusable.

A problem situation can also frequently arise when the host system 101 has similar or the same hardware and the same operating system, that is, for homogeneous combinations of host systems. For example, the Microsoft NT 4.0 operating system could represent such as problem on either homogeneous or heterogeneous hardware. Each host computer (computer A and computer B) will write a special identifying "tag" to each disk of the shared storage array. Whichever computer is the last to write to the disk or shared storage array will be the "Winner" as its "tag" or "signature" will remain intact after the last write operation, and the other hosts will act, and be treated like, they have never seen the storage array or members of the array before. Also, if computer A formats a disk, then another computer B also subsequently formats the same disk, computer A's format and data is now corrupt. This latter scenario is independent of similarities or disparities in the host's operating systems.

Having mentioned the Microsoft Windows NT operating system, we note that while exemplary embodiments of the invention make reference to Windows NT, Unix, and Novel by way of example the invention is not limited to the Windows NT, Unix, Novel, or to any other particular operating system environment, but rather is applicable to a broad range of computer systems, server systems, information storage and retrieval systems, and the like, and to various operating systems, and more generally is applicable to any computer and/or information storage/retrieval system.

With respect to FIG. 1, we now describe an exemplary distributed computing system 100 having first, second, and third host computers 101 (101-1, 101-2, 101-3) coupled to an array controller 104 which in turn is coupled to a storage subsystem 108 formed from one or more logical volumes, here shown as an array of logical disk drive storage volumes (108-1, 108-2, 108-3, . . . , 108-N). In general, these logical volumes 108 may correspond to physical hard disk drive devices, or to groups of such physical hard disk drive devices. In this embodiment, the three host computers 101-1, 101-2, and 101-3 are coupled to array controller 104 via a Fibre Channel Loop 120 communications channel, and the logical volumes 108 of the storage subsystem are coupled to the array controller 104 via an appropriate channel 122, such as for example either a Fibre Channel Loop communications channel or a parallel SCSI communications channel. For the Fibre Channel Loop, SCSI protocols are frequently used in addition to the Fibre Channel physical layer and related protocols and standards. Fibre Channel Loop 120 is advantageous for interconnections of the host computers because of the flexibility and extensibility of this type interface to a large number of host computers and also, with respect to the inventive structure and method, for the existing support of World Wide Number (WWN) identification.

In computing system 100, array controller 104 divides the storage into a number of logical volumes 108. These volumes are accessed through a Logical Unit Number (LUN) addressing scheme as is common in SCSI protocol based storage systems, including SCSI protocol based Fibre Channel Loop physical layer configurations. The term LUN refers to a logical unit or logical volume, or in the context of a SCSI protocol based device or system, to a SCSI logical unit or SCSI logical volume. Those workers having ordinary skill in the art will appreciate that the number of physical disk drives may be the same as, or different from, the number of logical drives or logical volumes; however, for the sake of simplicity and clarity of description here we use these terms interchangeably, focusing primarily on logical volumes as compared to physical disk drives. The manner in which physical devices are generically assigned, grouped, or mapped to logical volumes is known in the art and not described further here.

Each of the host computers 101 of the system 100 has an operating system as is known in the art. The operating system, such as Windows NT, on any single host will attempt to mount all of the logical storage volumes 108 that it detects are physically connected when host 101 boots, such as during host system power-up or reset. As a result, any data on any one of the logical volumes 108 can be accessed by the operating system. In situations where new disk storage (additional logical volume) is added to system 100 so that it is available to a host or when a user attempts to configure the storage already available to the host, unless constrained, the operating system (including the Windows NT 4.0 operating system) will automatically write an identifying signature to these new storage device(s).

This identifying signature typically includes information that allows the particular operating system (such as Windows NT) to uniquely identify the storage device(s). The format and content of such signatures are not important to the invention except that they exist, are usually established by the vendor of the particular operating system (e.g. Microsoft Corporation for Windows NT), and are known in the art. Hence the specific content and location of these signatures are not described further here.

Usually, a particular area on a storage device is reserved for the signature, but the implementation is specific to particular operating systems and installations. Hence, even for hosts having common operating systems, different host installations may cause problems. For example, the size of the storage, the operating system, the version and/or revision of the operating system, and the like, may differ from host to host. Significantly, one operating system may place important data in an area normally reserved for other reasons in a different operating system or in a different installation of that same operating system. Therefore, although an area may be reserved for Windows NT, it is unfortunately problematic that another Windows NT system will write a separate signature in the same area. For a given host hardware and operating system installation, the location of the signature is usually fixed. In general, the operating system vendor exercises considerable control as to the location at which the signature is written but since all of these operating systems assume they solely own the storage, there's no general way to assure that data won't get overwritten. This compounds the problem with traditional approaches and suggests that a more general solution that does not rely on luck to preserve data integrity is called for.

As another host system, such as a system incorporating a Unix operating system, may store data in the storage location to which the Windows NT "signature" was written earlier, the subsequently written Unix signature will corrupt the earlier signature and other data. Furthermore, the signature itself may subsequently be overwritten by data from another host computer during a normal write operation. Overwriting can happen at any time, but is most likely during a format or initialization process. In either event, it is clear that the information stored on the physical device and or logical volume will be corrupted.

It is therefore problematic that in traditional systems 100 each host computer 101 has complete access to all of the Logical Volumes 108, and no structure or procedure is available for restricting access to a particular logical volume by a particular host or group of hosts.

Therefore there exists a need for structure and method that resolves this shared access problem by efficiently testing and validating authorization to access a storage volume, logical volume, or storage device on the array controller to a specific set of host computers and limiting access only to authorized hosts, so that neither critical information nor data generally will be overwritten or otherwise corrupted.

SUMMARY

The invention provides structure and method for controlling access to a shared storage device, such as a disk drive storage array, in computer systems and networks having a plurality of host computers. In one aspect, the invention provides such a method for controlling access to a hardware device in a computer system having a plurality of computers and at least one hardware device connected to the plurality of computers. The method comprises associating a locally unique identifier with each the plurality of computers, defining a data structure in a memory identifying which particular ones of the computers based on the locally unique identifier may be granted access to the device; and querying the data structure to determine if a requesting one of the computers should be granted access to the hardware device.

In one embodiment, the procedure for defining the data structure in memory includes defining a host computer ID map data structure in the memory; defining a port mapping table data structure comprising a plurality of port mapping table entries in the memory; defining a host identifier list data structure in the memory; defining a volume permission table data structure in the memory; and defining a volume number table data structure in the memory. In one particular embodiment, the memory is a memory of a memory controller controlling the hardware device, and the hardware device is a logical volume of a storage subsystem.

The invention also provides an inventive controller structure, and a computer program product implementing the inventive method.

DETAILED DESCRIPTION OF EMBODIMENTS OF THE INVENTION

Figure 1:
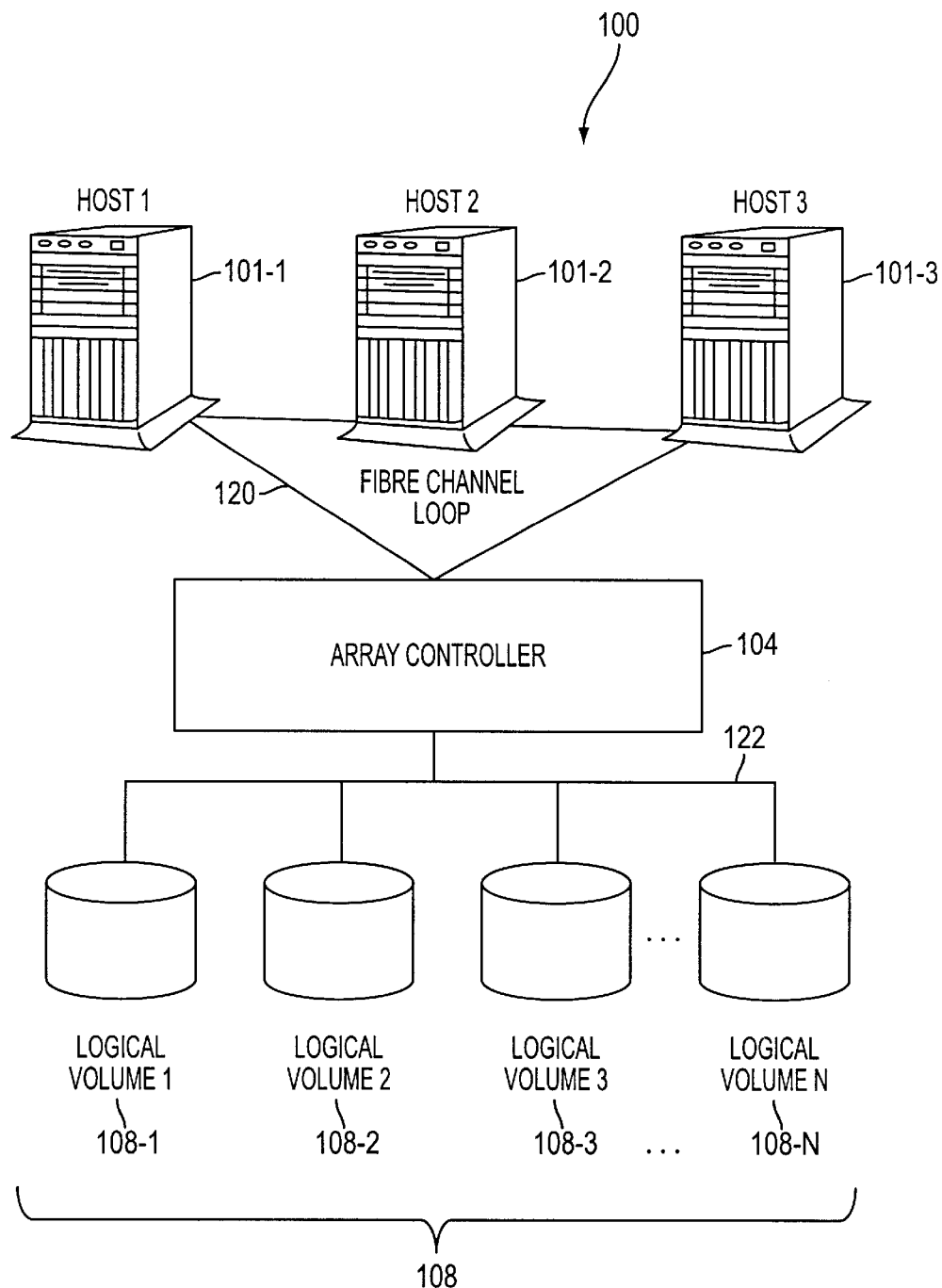
FIG. 1 is an illustration showing an embodiment of a distributed computing system having a plurality of host computers coupled to an array of logical storage volumes though a Fiber Channel Loop and an a disk array controller.

The invention includes method, apparatus, system, and computer program product for providing controlled access to storage volume(s) on an inventive storage system controller, such as a hard disk drive array controller 106. The inventive structure, method, and computer program product, including controller 106 and storage subsystem 108 having access controls, further solves the access and security problem of conventional systems and methods by limiting access to a volume of storage 108 on, or controlled by, the array controller 106 to a specific set of host computers 101, as identified by a unique identifier (for example the World Wide Name (WWN) 107 associated with the host computer 101 via its network interface or by using other identifying means, so long as that identifying means is unique among the interconnected devices. The invention also provides limited security control of data, where access to data must be limited or shielded from other users of the system. Further, the inventive method accomplishes this task with a minimal number of searches and overhead, and with minimal performance degradation. Where a particular host has two or more interfaces to the controller, including for example a host having multiple host bus adapters each having a unique ID, access may advantageously be further controlled based on the interface ID instead of, or in addition to, the host ID.

The inventive structure and method are particularly suitable for situations where one or more data storage array controllers are attached to multiple host computers (or to a single host having multiple interfaces) with a controller that will request data transactions with the storage devices, such as for example a Redundant Array of Independent Disk (RAID) storage device array. As already described, the problem exists for both homogeneous and heterogeneous combinations of host computer hardware and host computer operating systems, where here heterogeneity refers to either differences in hardware type or operating system. Usually heterogeneity of the hardware is not a significant issue, as this is resolved through the standards that define SCSI and Fibre channel operation. Heterogeneity of the operating system may more likely result in corrupted data.

In one aspect the inventive structure Host-to-Volume Mapping (HVM) feature restricts access to any particular configured Logical Volumes only to a single host or group of hosts. This provides access and security control of data for the storage array, and is particularly advantageous for maintaining data integrity in a Storage Area Network (SAN) environment, where multiple hosts are connected to a controller, frequently to an external controller. Storage Area Network (SAN) refers to a collection of one or more host computers attached to a common pool of storage resources. The Host-to-Volume Mapping (HVM) feature is desirably implemented as a software and/or firmware computer program product executing in a processor or CPU within the controller 106 and utilize data structures defined in a memory associated with the processor to alter the operation of the controller. In general controller 106 of the invention may differ from conventional controller 104; however, the invention may also be used with conventional controller suitably modified to provide the characteristics described herein. For example, the inventive computer program product may be stored and executed in controllers having a fibre channel host interface and appropriate memory for defining and storing the inventive data structures, such as for example, the Mylex Corporation DACSF, DACFF, and DACFFX controllers, as well as other controllers.

Aspects of controller design for certain exemplary Mylex Corporation controllers are described in the DACSX / DACSF / DACFL / DACFF OEM System Reference Manual Firmware Version 5.0—Mylex Corporation Part Number 771992-04 (Mylex Corporation of Fremont, Calif. and Boulder, Colo.), and herein incorporated by reference. SCSI-3 Primary Commands, such as commands that are applicable to fibre channel connected devices using SCSI-3 commands are described in SCSI-3 Primary Commands, T10/995D revision 11a—Mar. 28, 1997, also hereby incorporated by reference.

By utilizing the inventive HVM, each Logical Volume 108 may be configured to be visible to a single one of host computers 101, (for example to host 101-2 only) or to a selected group or set of host computers (for example to hosts 101-1 and 101-2 only.) Referring to the hardware configuration of FIG. 1, one simple HVM configuration would allow host computer 101-1 access to Logical Volume 108-1 only, host computer 101-2 access to logical volume 108-2 only, and host computer 101-3 access to logical volume 108-3 only; even though all hosts 101 and all logical volumes 108 are physically connected to the controller.

As described in greater detail herein, controller 106 uses novel data structures and a node name, such as the World Wide Name (WWN), associated with each fibre channel loop 120 device, including a Fibre Channel Host Bus Adapter installed in each host computer 101, to uniquely identify the host computers that have logged into controller 106. (A list of valid host computers that have been granted access to each logical volume, and their corresponding WWNs, may optionally be provided to external configurators, to provide a graphical user interface to assist in configuring the controller 106 and to configure the HVM.) Note that a node is one or a collection of more than one port and that a Node Name generally refers to a Wold Wide Name (WWN) identifier associated with a node. Port Name is a World Wide Name identifier associated with a port, for example a port at which a host or a logical volume couples to controller 106.

The inventive HVM structure, method, and computer program product provides a solution to the afore described shared access problem by utilizing a unique host identifier (host node name identifier) in conjunction with other structures and procedures to control access to storage on each logical volume. As the use of a host node name identifier is important to the operation of the invention, and as World Wide Names (WWNs) are an existing useful type of host node name identifier particularly for Fibre Channel Loop connected hosts and controllers, we briefly describe some attributes of WWN before proceeding with a more detailed description of HVM.

When the communications channel 120 coupling hosts 101 to array controller 106 is a Fiber Channel Loop compliant with the "Fibre Channel Physical and Signaling Interface" ((FC-PH) Rev. 4.3, X3T11, Jun. 1, 1994 standard, American National Standards for Information Systems), which standard is hereby incorporated by reference, each device on the loop 120 including each host 101 by virtue of a Fiber Channel Host Bus Adapter has a unique identifier, referred to as its World Wide Name (WWN) 107. WWN 107 are known in the art, particularly for Fibre Channel devices, and we only describe in detail aspects of the WWN that are useful in understanding the structure and operation of the invention.

A World Wide Name (WWN 107) is a 64-bit identifier (8-byte), with a 60-bit value preceded by a 4-bit Network Address Authority Identifier (NAAI), used to uniquely identify devices, nodes, or ports, including for example a Host Bus Adapter (HBA), for connecting a host computer 101 to a Fibre Channel communications loop 120. This WWN 107 is unique for each fibre channel device, usually in the form of a number (serial number) that the manufacturer registers with the appropriate standards committee through the process defined as a part of the Fibre Channel standards specification. It is unique to each fibre channel connect device manufactured. For example the fiber channel interface card or host bus adaptor (HBA) in each host has a unique WWN. While there are many fields and subfields in this character or number WWN string, from the standpoint of the invention, many of the fields and subfields are irrelevant, and for the purposes of the invention the WWN is conveniently thought of as a unique serial number for the fibre channel device. Detail of the format and content of the WWN are described in the "Fibre Channel Physical and Signaling Interface (FC-PH) Rev. 4.3, X3T 11, Jun. 1, 1994 standard, American National Standards for Information Systems (ANSI)", hereby incorporated by reference.

The WWN 107 is used to uniquely identify each host computer 101 connected to the Fibre Channel loop 120, or more specifically each Host Bus Adapter (HBA) coupling the fibre channel bus 120 to the processor and memory system in the host computer. Thus, if there are two fibre channel HBAs installed in a single host computer 101, that host computer will have two WWNs associated with it, and it will be possible to identify not only which host, but also which HBA of the host the communication was sent from or should be directed to in a response. As the WWNs are universal and currently exist, an aspect of the invention lies in the use of WWNs to allow access to a volume of storage based on the WWN 107. Furthermore, at least some embodiments of the invention may be implemented in existing hardware, while other embodiments benefit from or require specific controller hardware not provided in conventional controllers.

It is noted that while we describe the invention primarily relative to Fibre channel loops 120 and the WWN 107 associated with such Fibre channel loops, the invention is not limited to such Fibre-channel loops or to WWNs as the only host node identifier, and can be used with alternative communication channel strategies and protocols and/or with different host node identifiers, such as for example for parallel SCSI channels and SCSI IDs, although this would not represent a preferred configuration due to the limited number of SCSI addresses (15) and the limited physical distance (usually about 6 meters) between the SCSI devices, neither of which limitations are present in a Fibre Channel implementation. For example, various computing node identifiers may be envisioned for computers and storage volumes interconnected over the Internet or world wide web.

Figure 2A:
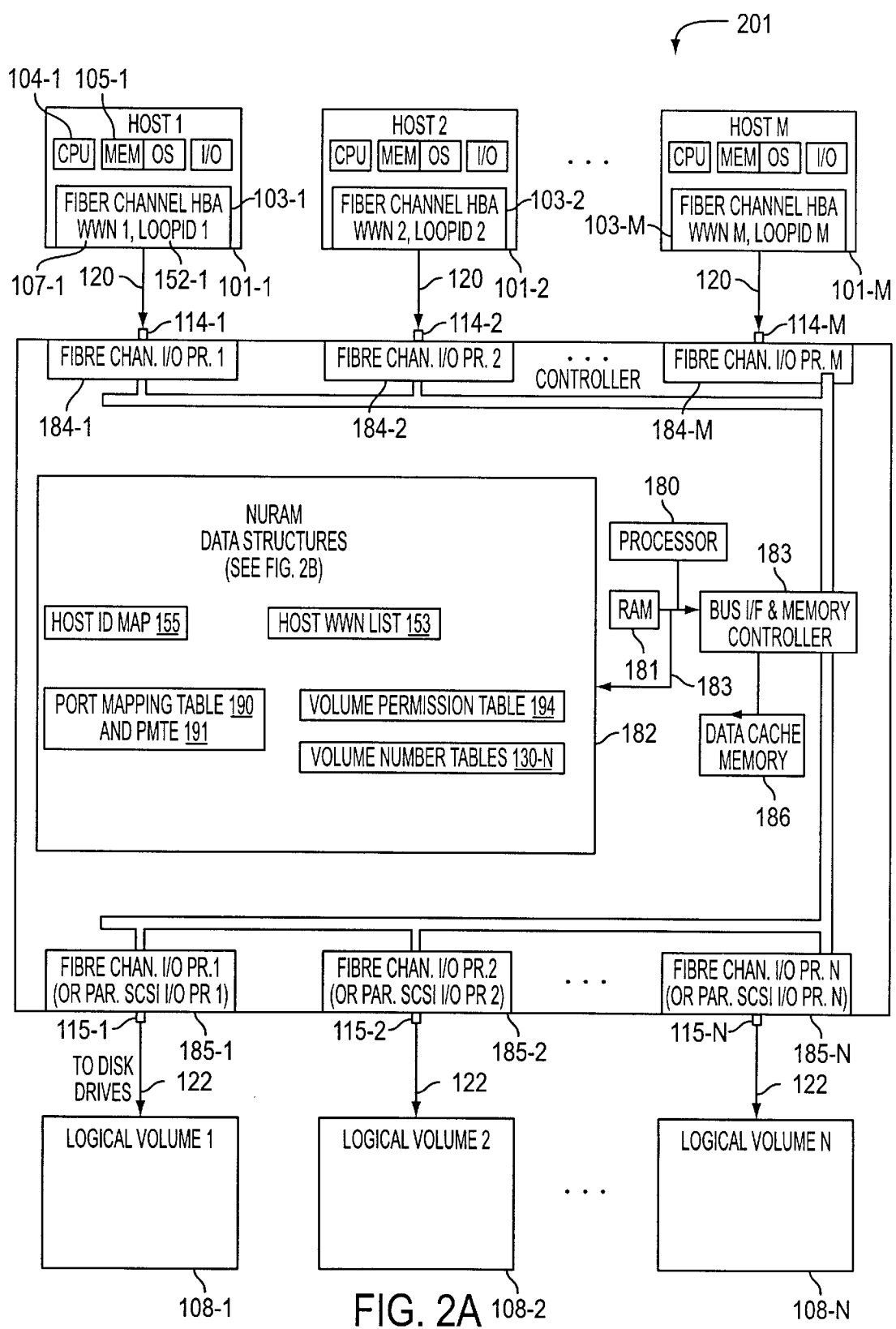
FIG. 2 is an illustration showing an embodiment of the inventive Host Volume Mapping structure including various data structures used for the inventive structure and method.
Figures 1, 2B:
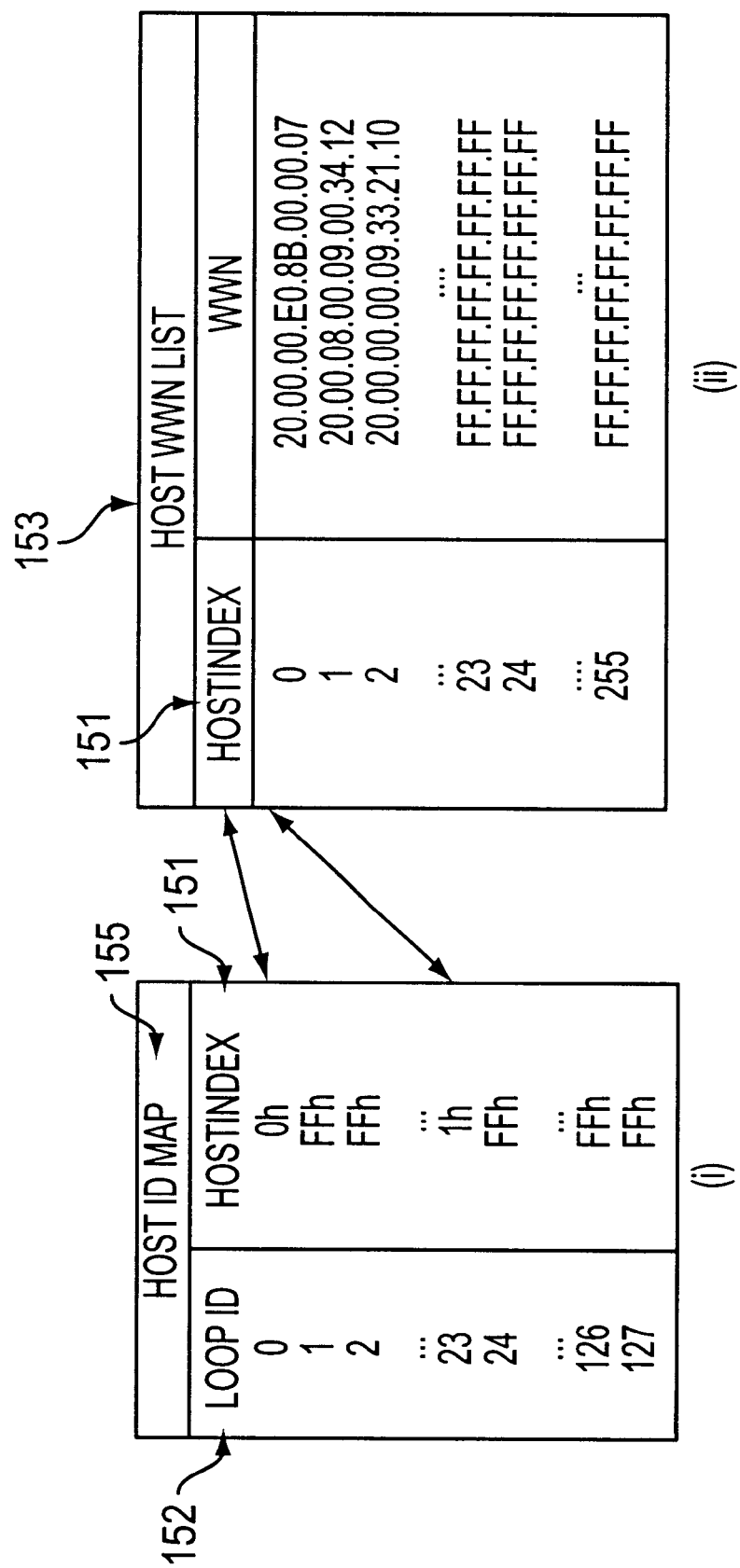
Figures 2, 2B:
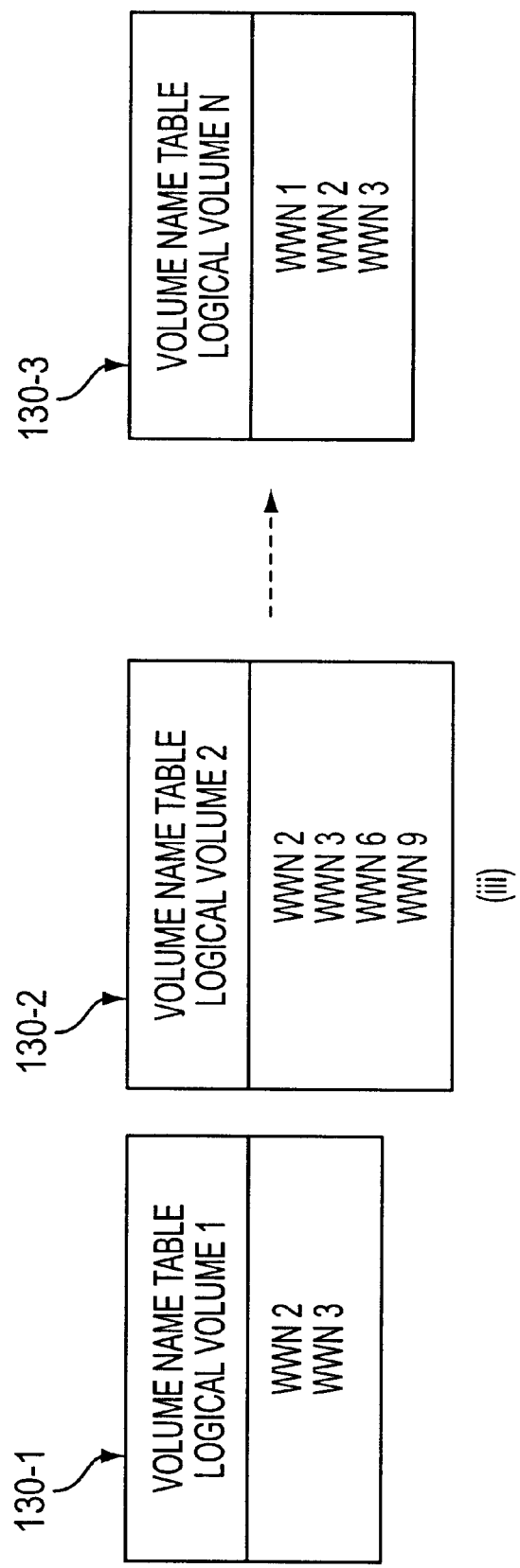

With reference to FIG. 2, we now describe an embodiment of the inventive Host Volume Mapping (HVM) structure and method in a system configuration in which a plurality of host computers 101-1, 101-2, . . . , 101-M attach to one or more external storage device array controllers, hereinafter "controller" 106, and a plurality of magnetic hard disk drives configured as a plurality of logical volumes 108 coupled to the controller; a configuration frequently used to implement a Storage Area Network (SAN) configuration. Host computers 101 are attached to controller 106 through a Fibre Channel arbitrated loop 120 and/or through a switch (of which many types are known). Logical Volumes 108 may be coupled to controller 106 using either Fibre Channel Arbitrated Loop 122, or where sufficient to support the number of units and the cable length limitations, via parallel SCSI chain. Logical volumes 108 may be configured as RAID or other storage subsystems as are known in the art.

Furthermore, while magnetic disk drives are specifically described here, it will be readily appreciated that other forms of data and information storage may be used, such as, but not limited to, hard magnetic disk drives, magneto-optical drives, optical drives, CD-ROM, DVD, optical disks, removable media such as Iomega ZIP disks, Iomega JAZ disks, tape drives, solid state storage devices, and other data and information storage devices. Finally, the HVM structure and method may be applied to any situation where controlling access to one device by another device is desired, hence while we describe controlling access to the logical storage volumes 108 by each host computer to preserve data integrity, the inventive method may readily be applied to controlling access to any other computer peripheral devices for any other reason. For example, access to color printers and CD-ROM recording devices may be restricted from particular computers where monetary payments for use of the relatively expensive computer peripheral has not been made, or for security reasons, to name but a few situations where controlling access may be desired.

We now describe an embodiment of the inventive Access Control and Validation Procedure (ACVP) 300 with reference to the computer system 201 in FIG. 2. FIG. 2a shows controller 106 and its relationship to host computers 101 and logical volumes 108, and further including a top-level illustration of the data structures defined in NVRAM 182 of the controller. FIG. 2b shows additional detail of the data structure. The phrase "data transaction" as used here refers to information transfers between a host 101 and the array controller 106 and includes such typical operations as reading and writing data to the array controller 106. A data transaction starts or is initiated by a host computer 101 when it issues a data transfer command (typically read or write request) over the fibre channel bus 120.

Each logical volume 108 in the storage array is assigned or associated with a volume data structure 140, one element of which is a Volume WWN Table (VNT) 130. These VNT tables (130-1, 130-2, . . . , 130-N) may be thought of as separate small tables or as a single larger table, but in any event provide a VNT data structure used in subsequent search or query operations. (We will later expand the description of the concept of the Volume data Structure to encompass a Volume Permission Table 160.) For example, Logical Volume 108-1 is associated with VNT 130-1, Logical Volume 108-2 is associated with VNT 130-2 and Logical volume 108-N is associated with VNT 130-N. This or these VNT tables are stored as a part of controller 106 configuration data stored in a non-volatile memory (NVRAM) 182 of controller 106 and desirably on the disks (logical volumes) associated with that controller 106. This configuration, typically referred to as a "Configuration on Disk" (COD) can be accessed (written and read) by vendor unique direct commands which permit the storage volume array 108 to be initially configured and/or reconfigured as necessary. These Vendor Unique commands are described elsewhere in this specification.

Each Volume WWN Table 130 has a finite number of entries at any given time, one entry for each WWN that is permitted to access its associated logical volume 108. But, while the size or number of entries in any one Volume WWN Table 130 is finite at any given time, the finite number corresponding to the number of fibre channel devices (hosts or HBAS) that are permitted to access the volume, the size of the Volume WWN Table is not fixed and can be expanded when necessary to any size so as to accommodate the required number of fibre channel device entries, limited only in a practical sense by the memory available to store the entries. In one embodiment, if all of the entries in the VNT associated with the logical volume are zero, the zero value serves as an indication that all hosts may have access to that particular logical volume.

At the start of a data transaction, a host computer 101 desiring to access a logical volume 108 controlled by controller 106 must login or otherwise identify its access request. Host 101 first logs in to the logical volume storage array 108 via controller 106, then makes requests to access a specific logical volume. Aspects of this login are a conventional part of the fibre channel arbitrated loop protocol and not described here in detail. (See Fibre Channel Arbitrated Loop Protocol Standard and Fibre Channel Physical and Signaling Interface, which are herein incorporated by reference.) As a part of this login transaction, the array controller 106 is notified that a host 101 is attempting to connect to the logical volume(s) 108 and the unique WWN 107 and Loop ID 152 corresponding to the requesting host 101 (or HBA 103 associated with the host 101) is communicated in the form of a command packet 109.

As the login procedure continues, controller 106 identifies a Host Index (HI) 151 for that host based on the received Loop ID 152. In one embodiment, the Host Index 151 is generated by the controller sequentially based on the order of the hosts attempt to login to a Fibre Channel port. The first host to attempt a login will be assigned HI=0, the second host will receive HI=1, and so on. Other host computer to HI assignment rules may alternatively be implemented. The Host Index 151 functions or operates as a pointer to allow simplified access to information stored in the Host WWN List 153 as well as indirectly into the Volume WWN Tables (VNT) 130 and Volume Permission Tables (VPT) 194 as described in greater detail below. In one embodiment, the Host Index consists of 4 bits, so that at least 16 different hosts can be uniquely identified, while other embodiments provide a larger number of bits and permit a greater number of hosts to be uniquely identified.

We note that prior to this attempted login, a first list of WWNs 107 of host computers 101 that have previously logged in to controller 106 is stored in a Host WWN List 153 data structure defined in memory (NVRAM) 182 of controller 106 and indexed by a Host Index 151. For example, in FIG. 2, Host WWN List 153 includes indexed storage for up to 256 (numbered 0–255) host WWN 107 entries in a linear list. The WWN entries in the list (for example, the entry corresponding to HI=0 showing "20.00.00.E0.8B.00.00.07" hexadecimal) are exemplary and do not necessarily bear any relationship with past, present, or future actual WWN associated with manufactured devices. Storage locations in Host WWN List 153 that are empty are indicated by "FF.FF.FF.FF.FF.FF.FF.FF".

A second or Host ID Map List 155 data structure storing a list of Host Indices 151 also defined in memory (NVRAM) 182 of controller 106 is indexed by Fiber Channel Loop ID 152. This Host ID Map List 155 maps each Loop ID 152 to a Host Index 151 as illustrated in FIG. 2b. In one embodiment, the Loop IDs 152 in consecutive memory storage locations are consecutive numbers (the pointer), while the Host Index 151 values are not consecutive and are represented by two-byte hexadecimal values.

The Host ID Map list 155 is queried by the Host Loop ID 152 pointer. In the example depicted in FIG. 2b, the Host Loop ID 152 associated with a particular received command 109 is the value "23", and therefore serves as a pointer or index into Host ID Map Table 155 to select entry Loop ID number 23 (actually the 24$^{th}$ entry beginning from entry zero) of the Host ID Map 155. Host ID Map 155 entry number 23 contains the Host Index "01h" which in turn serves as a pointer or index into Host WWN List 153 to select the WWN 107 associated with that Host Index, in this case the second entry starting from location zero, here the WWN "20.00.08.00.09.00.34.12".

In the embodiment of FIG. 2, controller 106 maintains only one Host WWN List 153 for all host ports 114, 184; and even for the case of multiple controllers 106, this structure and procedure allows for the simplest representation of the fibre channel connection topology in that a particular host computer's Host Index (HI) 151 remains the same regardless of the port or controller the host is communicating with.

Once the Host WWN List 153 and Host ID Map list 155 have been established as the host computers login to the array controller 106, and the Volume WWN Table 130 is generated by the array controller as a result of these logins, the procedure is able to validate or alternatively deny access to a host attempting the login.

We now describe an exemplary LUN-to-Logical Volume Mapping (Volume Mapping) Structure and procedure. "Volume Mapping" (VM) is a process where a controller 106 maps a particular Fibre Channel (as identified by the I/O processor on which the command is received), Fibre Channel Loop ID, and SCSI LUN to a particular Logical Volume. A SCSI LUN is a path to a logical volume of storage. "Host-to-Volume Mapping (HVM)" extends the concept, method, and structure of Volume Mapping (VM) by allowing a particular Host (identified by the Fibre Channel, Fibre Channel Loop ID, and SCSI LUN) to a logical volume. HVM therefore permits host access control to volumes while VM does not. According to fibre channel conventions, the host computer loop ID is assigned based on hardware, software, or negotiated settings, but other assignment rules may alternatively be used in conjunction with the invention structure and method.

The Volume Mapping feature maintains a Volume Mapping Table in the form of a Port Mapping Table 190 for controller 106, port 114, Fibre Channel I/O Processor 184, and Logical Volume 108 combinations. This allows a specific Logical Volume to appear as a different LUN on each host port 114. There may be a plurality of host ports 114 and Fibre Channel I/O Processors 184 for each port, and each host port is associated with the particular controller 106. There may generally be multiple host computers attached to the controller host port or ports by virtue of the characteristics of the Fibre Channel loop or the parallel SCSI protocols and/or specifications. Allowing a specific logical volume to appear as a different LUN on each host port is advantageous because it permits great flexibility in allowing host access to the logical volume, and for a HVM environment described in greater detail hereinafter, this feature is particularly advantageous because the permitted flexibility allows storage volume mapping to a heterogeneous collection of host computers with heterogeneous operating systems. Each of these systems will have specific requirements for mapping storage and accommodating these different storage mapping requirements advantageously relies on the ability to map storage in a variety of different ways.

The idea of Volume Mapping is to break up the storage capacity of the physical disc drives connected to the array controller into "Logical Volumes", then to control the host computer's access to these logical volumes by assigning an access path to each logical volume and checking to verify that an attempted access path is valid. Typically, the access path consists of a host-to-controller Port 114 (i.e., which Host I/O Processor 184), the SCSI ID (or fibre loop ID) of the Host Processor 184, and the SCSI LUN Number of the read or write command.

The Port Mapping Table Entries 191 contained within the Port Mapping Table 190 are advantageously instantiated for each controller 106, each host channel 184, and each logical volume 108 as illustrated in FIG. 2b, and defines how each host port 114 and host port I/O controller 184 connects through array controller 106 to each logical volume 108. The Port Mapping Table 190 contains a plurality of Port Mapping Table entries 191, one entry for each controller 106, Host I/O processor 184, and Logical Volume 108 combination. Each Port Mapping Table entry 191 includes an 8-bit (1-byte) Target ID 192 containing the loop ID of the Logical Volume on this port, an 8-bit (1-byte) LUN 193 containing the LUN number for the logical volume on this port to which the command is directed (also referred to as the target loop ID), a 32-byte Volume Permission Table 194, and a Flag Bit 195 field (8-bits) storing various flag indicators.

The flag bits have specific functions. If a "Valid" flag (bit 6) is clear then all hosts are granted access to the logical volume. If the "Valid" flag bit (bit 6) is set "1" and the Volume Permission Table is also all zeros, then no hosts will have access to the logical volume.

The Volume Permission Table 194 is an array of one bit flags that go from bit position 0 to bit position 255. More or fewer bits may be provided depending upon the number of devices supported. If one of these bits is non-zero, then the Logical Volume 108 may be accessed by the host 101 with the WWN found at the corresponding Host Index position in the Volume WWN Table 130. For example, if position 5 in the Volume Permission Table is set to a one ("1"), Volume WWN Table 130 is examined at position 5 (HI=5) and the WWN contained at that location is read or queried. The host with this WWN will be granted access to this logical volume.

The Port Mapping Table Entries 191 are advantageously instantiated for the controller 106 in a single controller, or for each controller in the case of a multi-controller (e.g. duplex-controller) configuration, for each host channel, and for each logical volume. This means that there is a Port Mapping Table 190 that defines how each host port (the Host Computer Fiber Channel I/O Processors 184 in controller 106) connects to each logical volume.

Once the Logical Volumes 108 are configured, the controller 106 maintains a Volume Permission Table 194 in its processor memory 182 for each Logical Volume containing a list of WWNs for hosts permitted access to the logical volume. This table identifies which of the host computers 101 are granted access to each particular Logical Volume 108 coupled to the controller based on the WWNs. A controller 106 may typically have a plurality of host ports 114 and disk drive ports 115 and associated I/O processors 184, 185 at each port. The I/O processors such as host I/O processors, Fibre Channel I/O processors 184, 185 can be the same type, but these are segregated into host ports 184 (for communication with the host computer) or disk ports 185 (for communication with the disks.)

In one embodiment of the invention, an Intelligent SCSI Processor (ISP) chip is used for Fibre Channel I/O Processors 184, 185. The ISP processor chip is manufactured by Q-Logic Corporation and is available from Q-Logic Corporation of 3545 Harbor Blvd, Costa Mesa, Calif. 92626. Several variations of ISP chips are manufactured by Q-Logic in the "ISP product family".

Controller 106 uses the LUN number requested by the host and the identity of the host-to-controller port 114, 115 (or 184, 185) at which the command was received, both of which are produced by the ISP with command, to determine which Logical Volume the host is trying to access. The operation of Fibre Channel protocol chips, such as ISP, is known in the art and not described in further detail here.

Controller 106 uses the Volume WWN Table 130 to determine allowed and disallowed access to a specific logical volume by any particular host computer. If a host computer 101 sends a new command to controller 106, the controller validates the WWN, controller port, and LUN against data in the table 130 prior to servicing the host command. If the WWN, LUN, and host-to-controller port information are valid for the Logical Volume, the command requested by the host is completed normally. However, if the WWN, LUN, and host-to-controller port combination are not valid for the logical volume, the requested command is not completed normally and a status is returned indicating that the particular logical volume is not supported. (However, three exceptions occur and are described below.) In one particular embodiment of the invention, program code implemented as firmware 301 provides that a host command that cannot be validated is completed with a "Check Condition" status, with the sense key set to "Illegal Request (05h)" and the sense code set to "Logical Unit Not Supported (25h)".

We now focus this description toward an embodiment of the inventive Host Volume Mapping (HVM) structure and method. In this context a diagram of the various data structures, lists, bit maps, and the like present on the controller 106, host 101, and logical volumes 108 along with their relationships to each other are illustrated in FIG. 2b. The existence of the WWN 107 for each Fiber Channel Loop 120 coupled host computer 101 provides an opportunity to utilize the WWN in the inventive method to establish a separate table of allowed WWNs, the Volume WWN Table 130 for each logical volume 108. Access to each particular logical volume 108 is permitted by disk array controller 106 only when the WWN of the particular host computer requesting data from the particular logical volume 108 is contained in the Volume WWN Table 130 associated with the particular logical volume 108. The WWN must be present in the table, and if it is present and the host has logged onto the array, only a check of the Volume Permission Table is further required to validate access. For an array of N logical volumes, N Volume WWN Tables 130 (130-1, 130-2, 130-3, . . . , 130-N) are provided in the system. If all volumes may be accessed by the identical set of host computers, each of the N Volume WWN Tables will contain the same list of host WWNs; however, the contents of the N Volume WWN Tables 130 for the logical volumes will generally differ when different volumes are available for access by different hosts.

At this point array controller 106 searches all of the Volume WWN Tables 130 associated with each logical volume (that is Tables 130-1, 130-2, . . . , 130-N) to determine which, if any, of the logical volumes the requesting host has permission to access. A host will have permission to access a logical volume when that host's world wide name appears in the Volume WWN Table 130 associated with that logical volume and will not have permission to access a logical volume when that host's world wide name does not appear in the table. Thus the array controller controls access.

The Volume Permission Table 194, is generated as the search proceeds and is kept as a part of the Port Mapping Table 190. The Volume Permission Table 194 includes a Permission Indicator 195 that indicates whether the particular host with HI has permission to access data on the logical volume. These VPT 194 are also illustrated in FIG. 2b and identify which host (based on the Host Index 151) have permission to access and which do not.

As the search of the Volume WWN Tables 130 proceed, the Volume Permission Table 194 entry for the particular host (as identified by that host's HI) will be set to either "true" (equal to 1) or "false" (equal to 0) depending on the outcome of the search. For example, if the Volume WWN Table 130 search identifies that a host should be allowed access to a particular logical volume (when that host's WWN appears in the Volume WWN Table 130 associated with that volume), the Volume Permission Table 194 entry (Permission Flag 195) for that host (as identified by the HI) will be set to "true" or "1", indicating that the host has access to that logical volume. On the other hand, if the query identifies that the host's WWN does not appear, the Volume Permission Table 194 entry (Permission Flag 195) for that host (as identified by the HI) will be set to "false" or "0".

When the host computer 101 attempts to read or write a logical volume 108, the HI 151 for the requesting host is determined by controller 106 based on that hosts Fibre channel Loop ID 152 which is returned by the Fibre channel I/O processor 184 along with detailed information that fully defines the operation, including the LUN to which the read or write request is addressed. If the request is not a Vendor Unique command (which might indicate an attempt to configure or reconfigure a volume and require special handling), the array controller 106 examines the Volume Permission Table 194 for that HI and for that logical volume. If the permission indicator associated with that HI is true ("1"), the request is executed normally. That is, the read, write, or other access request is executed using the normal procedure for reading or writing data to or from the logical volume. On the other hand, if the permission indicator associated with that HI and for the logical volume to which the request is addressed is false ("0"), then the read or write command is rejected back to the host computer from which it was sent with an error condition.

Special conditions exist when the request is either an "Inquiry" command, a "Vendor Unique" command, or a "Report LUNs" command. These commands are generally associated with determining the configuration or characteristic of the system, or with configuring or reconfiguring the system or components thereof, such as the controller 106. We describe aspects of these special commands in greater detail elsewhere in this specification. For other than Inquiry, Vendor Unique, and Report LUNs type commands, if a request is made by a host for a logical volume and the logical volume does not have permission for that host, the array controller will assert an error condition and deny access.

If the host has permission and the command is neither an Inquiry, nor a Vendor Unique, nor a Report LUNs command, the command is processed normally. Normal processing of a read command means that upon receipt of a read command the array controller will read the data from the attached disk drive or drives (logical volumes) and return this data to the host. Upon receipt of a write command the array controller will store the data sent by the host to the attached disk drive or drives.

In addition to these procedural steps the controller 106 should also verify that the logical volume is mapped to the controller port on which the command was received. As there can be multiple host-to-controller ports 114, 184; and a logical volume can be mapped to any single one of the ports, to any selected plurality of the port, or to none of the ports; the controller 106 should assure that the logical volume can be accessed through the particular host-to-controller port on which the command was received. The controller should also verify that the logical volume is mapped to the Logical Unit Number (LUN) of the command. Since each port can have many logical units as defined in the SCSI and Fibre Channel specifications, this allows one port to access many devices. Finally, the controller should verify that the WWN is valid for this logical volume, as already described.

These procedures allow the host 101 and read and write data when access is permitted, and to identify that a logical volume 108 is present in the array and in the computing system 100 and mapped to that Logical Unit Number (LUN), but does not allow the data on that logical volume to be accessed and potentially altered when access is not permitted. Providing a capability for the host system to identify the presence of the logical volume and mapped to a particular Logical Unit Number is desirable because conformity with SCSI standards is desirable and it is required by the SCSI protocol to allow any host computer to determine what storage is available, and what the parameters of that storage all (size, transfer capacity, etc.).

Frequently, the configuration of the array controller(s) 106 is stored on a special reserved area on the disks, this is referred to as "Configuration on Disk" (COD). This permits more efficient array controller 106 configuration when an array controller is replaced (such as for example after a controller failure). The replacement controller can retrieve the original configuration from the disk and automatically restore it rather than having to figure out its configuration information during a separate and time consuming reconfiguration procedure. Where Configuration on Disk (COD) space is limited, the maximum number of connected hosts may be limited, for example, to some number of hosts, such as to sixteen hosts. In other embodiments where COD is not limited, the maximum number of connected hosts parameter may be set to 256 entries so as to allow a sufficient number of entries for a fully populated loop in accordance with the fibre channel specification.

In addition to the Volume WWN Table 130, firmware in array controller 106 uses the Host ID Map 155 to translate from a host computer's fibre channel loop ID 152 to the correct Volume WWN Table 130 entry. This allows hosts 101 to change their particular fibre channel loop ID 152 without affecting the Volume WWN Table 130. A Host ID Map 155 is maintained for each fibre channel port on array controller 106. The maximum number of fibre channel host node (WWN) names that can be accommodated is set to 256 to allow any loop ID in the range of 0 to 255.

The first time a controller 106 is booted with firmware containing the HVM feature, following the first Loop Initialization Primitive (LIP) which resets the Fibre Channel, the firmware executing in the controller 106 retrieves the login information from all hosts 101 on the loop 120. From the login information, the firmware constructs the Volume WWN Table 130 as well as the Host ID Map Table 155. These two tables in tandem provide the firmware the capability to correctly translate the loop ID 152 embedded in a new command from the fibre protocol chip (e.g. ISP chip) to the Host Index 151, which in turn identifies a host 101 with a specific WWN 107. Effectively, the loop ID 152 is mapped to the host WWN 107 by: (i) first mapping the loop ID 152 to the Host Index 151, and (ii) then mapping the Host Index 151 to the host WWN 107. This approach is advantageous because only a small (minimum) number of searches and comparisons are needed to determine if a particular host should be granted access to a logical volume.

Figures 2, 2B, 3:
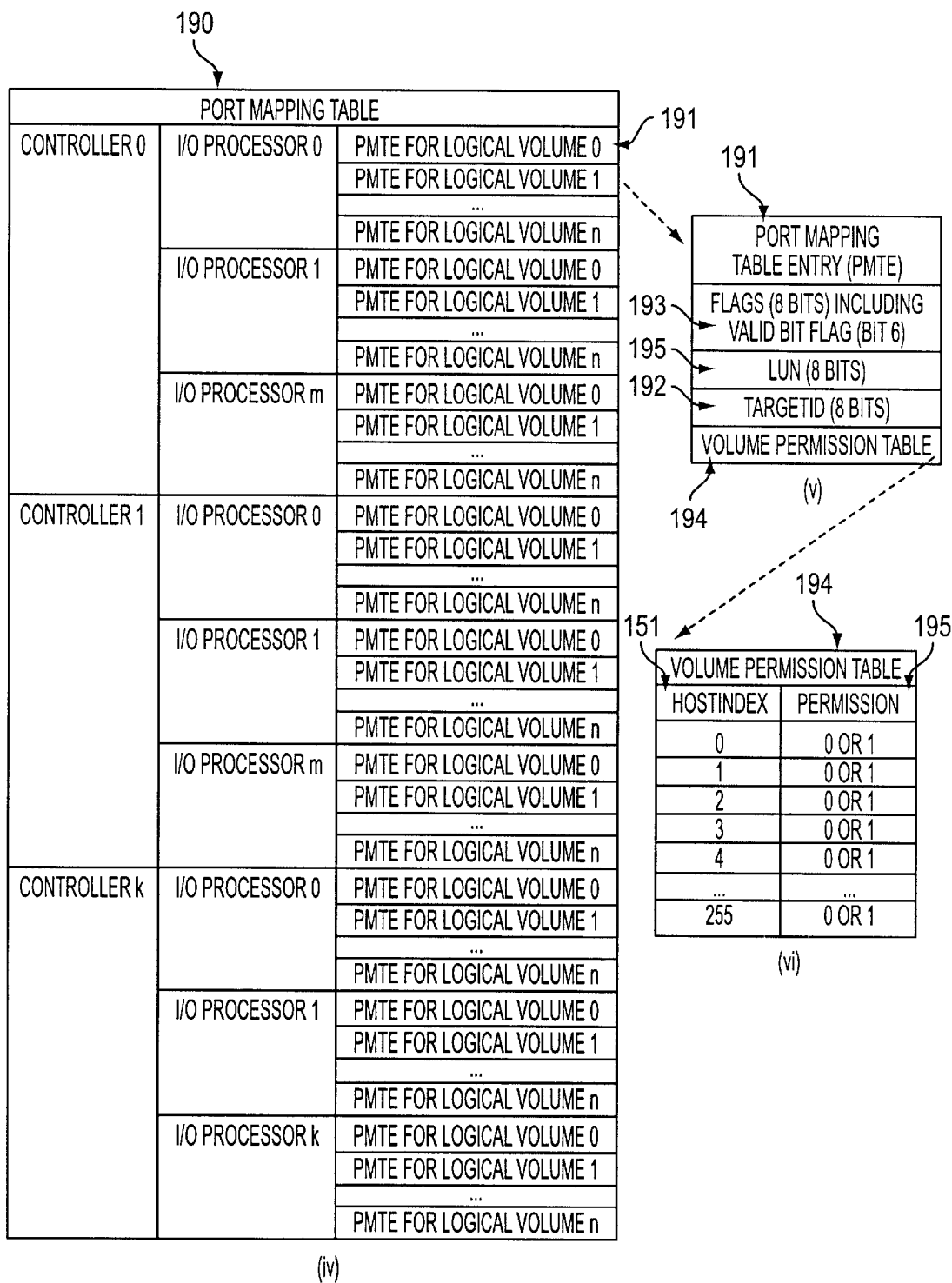
FIG. 3 is a diagrammatic flow-chart illustration showing an embodiment of the Access Control and Validation Procedure of the Host Volume Mapping method.
Figure 3A:
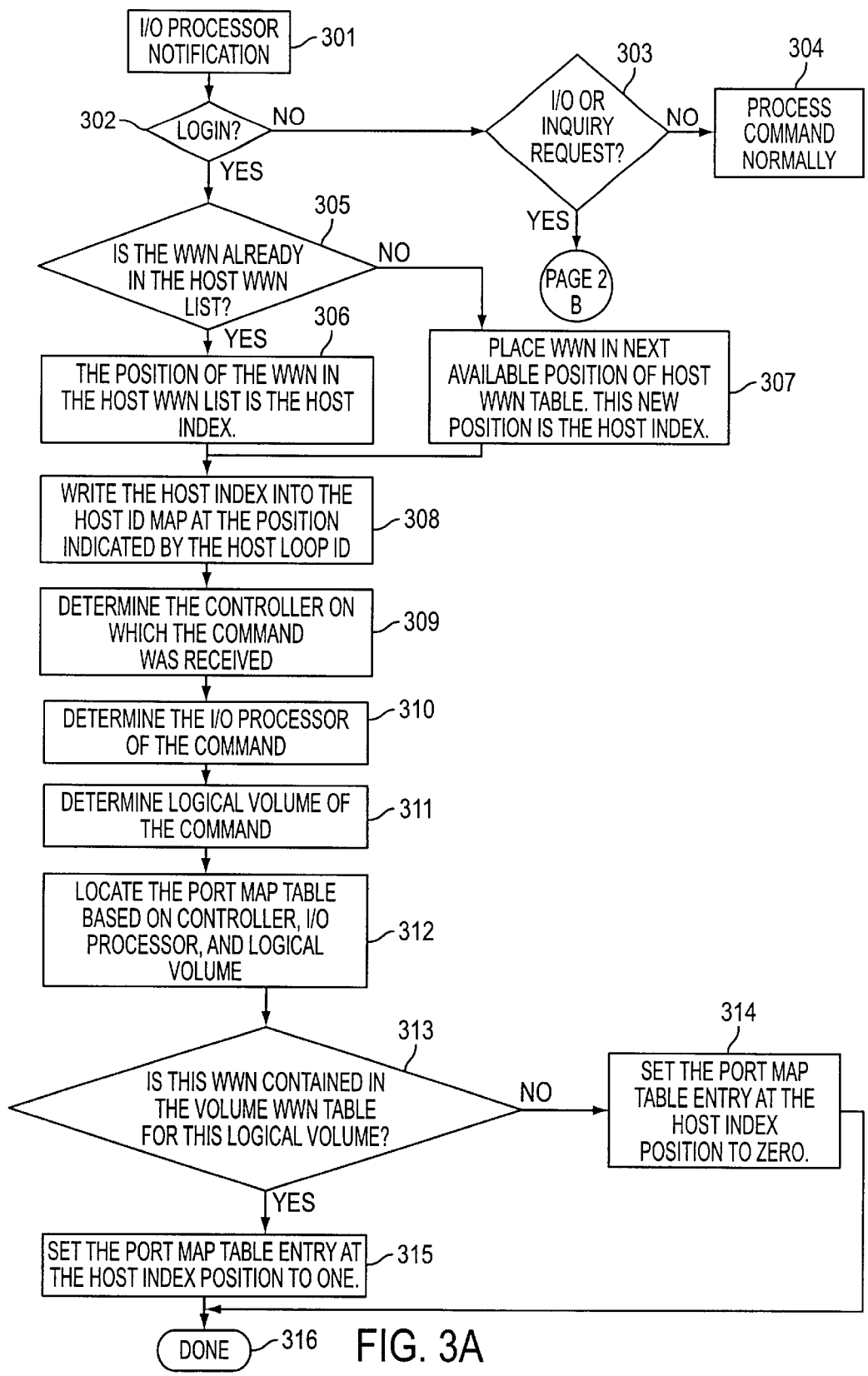
Figure 3B:
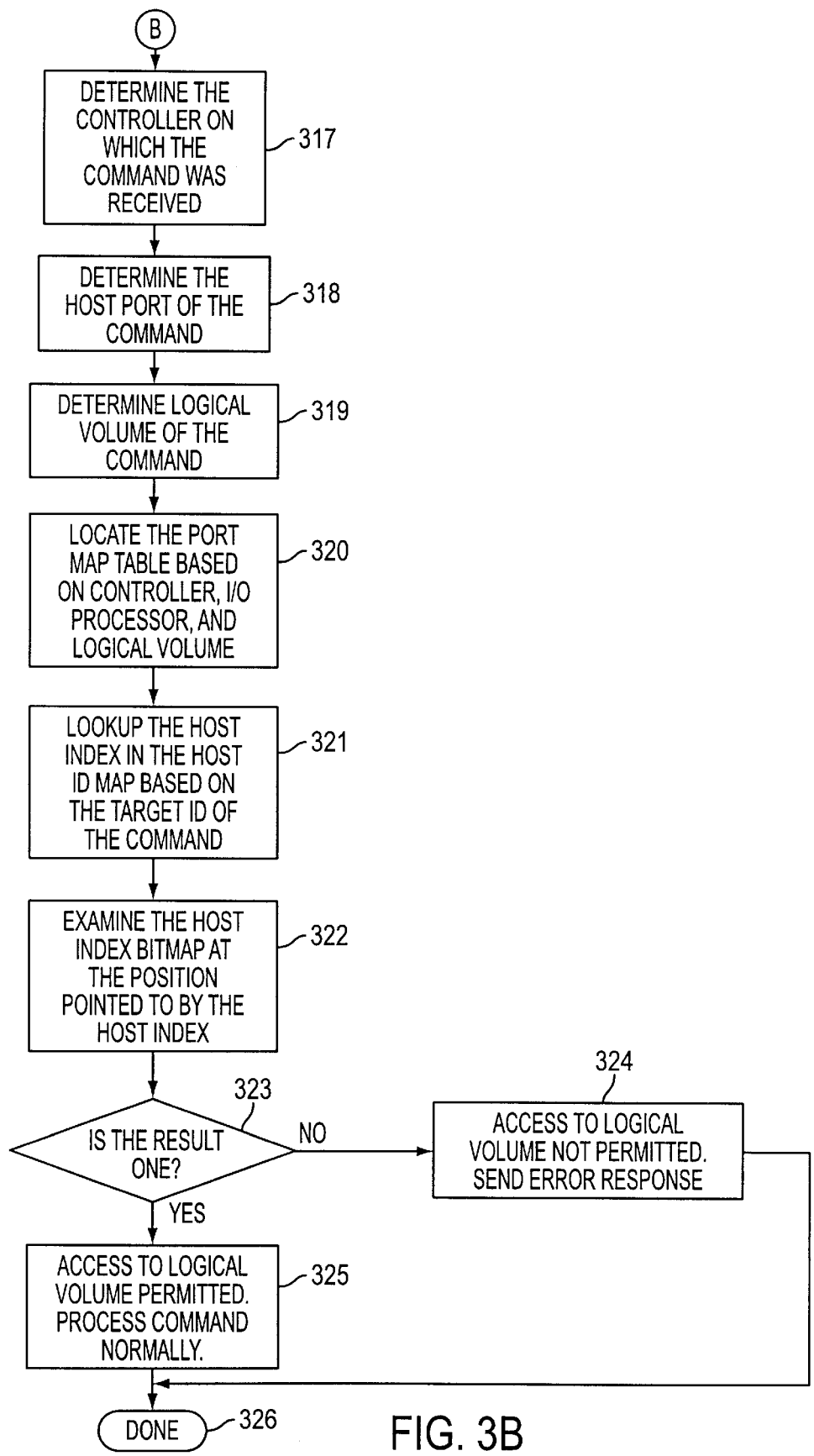

We highlight an embodiment of the inventive procedure 300 relative to the flow chart diagram of FIG. 3 (FIG. 3*a* and FIG. 3*b*) and which begins with a determination as to whether there has been an attempt by a host to login (Step 302). When a host login attempt is detected (Step 302), the Controller 106 searches for the WWN 107 of the host attempting the login in the Host WWN List 153 (Step 305). If the WWN of the controller attempting the login is found (Step 306), the position of the host's WWN 107 in the Host WWN List 153 is the Host Index 151. If the WWN is not found, the WWN 107 of the host attempting the login is added to the end of the Host WWN List 153 (Step 307) and that position is the Host Index 151. The Host Index 151 is then placed into the Host ID Map 155 at the position indicated by the host's Fibre Channel Loop ID 152 (Step 308). The controller 106 then collects the following information from the Fibre Channel I/O Processor 184: the controller (Step 309), the I/O Processor on which the request was made (Step 310), and the Logical volume for which the command was targeted (Step 311). (The process of collecting this information is typically unique to the particular hardware that implements the Fibre Channel I/O Processors 184, and therefore is not described here in detail.) This information allows the controller 106 to identify the correct Port Map Table 191 (Step 312), which contains the Volume Permission Table 194 for that logical volume 108. The controller 106 then searches the Volume Name Table 130 associated with that LUN to determine if that host attempting the login is allowed to access that logical volume 108 (Step 313). If a matching host WWN 107 is found in the Volume Name Table 130 for that logical volume 108, the controller 106 sets the Volume Permission Table 194 entry pointed to by the Host Index 151 to "true" or "1"(Step 315). If a matching WWN is not found for that logical volume 108, the controller 106 sets the Volume Permission Table 194 entry pointed to by HI to "false" or "0"(Step 314).

Controller 106 waits for a host access request (e.g. a command) to be received. On receipt of a host access request (for example, a read or write command, or an Inquiry or Vendor Unique command), controller 106 determines the command type (Step 302). Once a command is received, controller 106 determines the type of command to be an I/O command (such as a Read Command or a Write Command), or a Vendor Unique Command or Inquiry Command (Step 303).

If the request is an I/O Command (for example, a Read command, a Write command, or an Inquiry command), controller 106 determines the identity of the controller in which the command was received (Step 317), the host port of the command (Step 318), and the LUN and corresponding logical volume to which the command is addressed (Step 319). The proper Port Mapping Table is located based on the controller, host port I/O processor, and logical volume (Step 320); and the Host Index in the Host ID map is identified based on the Target ID of the command (Step 321). Controller 106 then examines the Volume Permission Table 194 at the position pointed to by the Host Index of the command to determine if the position stores a "1"bit (true) or a "0" bit (false) (Step 322). If the Permission Indicator value is true, access to the logical volume is permitted and controller 106 processes the command normally (Step 325). The process then completes and returns (Step 326). If the value is false, access to the logical volume is not permitted, controller 106 responds with an error condition (Step 324), such as an error condition indicating that storage space is not available for that logical volume, and the process completes and returns (Step 326). If the request is not an I/O command but instead either an Inquiry Command or a Vendor Unique command, then the response depends on the type of command. If the request is a Vendor Unique command, controller 106 processes the command normally, and returns (Step 304).

As already described, Host-to-Volume Mapping (HVM) is an enhancement and extension of the Volume Mapping (VM) capability of the array controller already described, and maintains a port mapping data structure on a per logical volume basis. By "per logical volume basis" we mean that the port mapping data structure is instantiated for each logical volume. In the HVM enhancement we provide the host's WWN as a further access path qualifier.

The inventive procedure 300 is advantageously implemented as a computer program product 301 defined and stored in the memory, usually NVRAM 182, of controller 106 and optionally stored in memory of a host or on other storage media and downloadable to the controller. The program product 301, or executable portions thereof, is moved from memory 182 to RAM 181 associated with processor 180 of controller 106, and is executed by the Processor 180 within the controller. Processor Memory 181–182 refers to RAM, ROM, NVRAM and combinations thereof. Data to be sent between the host computer 101 and the logical volumes or disk drives 108 is buffered in the Data Cache Memory 186 which is accessed though the PCI Bus Interface and Memory Controller 183, though other interfaces may be used. The Fiber Channel I/O Processors 184 (184-1, 184-2, 184-3, . . . , 184-M) send and receive data from the host computers 101 and buffer this data in the Data Cache Memory 183. Likewise, the Fibre Channel or SCSI I/O Processors 185 (185-1, 185-2, . . . , 185-N) send and receive data from the logical volumes or disk drives 108 and buffer this data in the Data Cache Memory 186. Processor 180 coordinates the activities of all of the I/O processors 184–185, and handles scheduling of tasks including read and write tasks, and error handling.

The inventive method minimizes the number of required searches at least in part because an efficiently organized and structured Volume data structure 142 including Volume Permission Table 194 associated with each logical volume was built (or updated) at login. In the embodiment of the invention described here, it is only necessary to examine one byte (one-bit) before access privileges can be verified and a read or write operation can be scheduled. A less efficient implementation of this functionality might be provided within the invention without the Volume Permission Table 194, but then a separate search of the Volume WWN Table would be required for every read and write command received. For example, there would be a requirement to search through and compare up to 16 entries at 8 bytes per entry of all the Volume WWN Tables 130 for each and every read and write operation. No data transfers would occur until these comparisons were complete and would impose significant limitations and increase response time and reduce throughput for the entire system. In the preferred embodiment of the invention, a search is only required at login and thereafter access privileges are determined very quickly using the Volume Permission Table 194.

The above described embodiments provide several advantageous features and capabilities. These include: (i) A Logical Volume maps to a single LUN only on a specific host port; (ii) a Logical Volume maps to the same LUN for all hosts that are granted access to the Logical Device in the Volume Permission Table (or Host Index Bit Map); (iii) a Logical Volume may map to different LUNs on a different controller or different host port; and (iv) multiple Logical Volumes may map to LUN 0 (or any other LUN) on a single host port, provided that there is no overlap of the Volume Permission Table (or Host Index Bit Map) for the Logical Devices.

We now return to a description of certain vendor unique commands so that the manner in which the system may be originally configured to accommodate HVM and reconfigured when changes or updates are desired, may be more readily understood. Vendor Unique commands allow the system 100 to be configured, and are not usually logical volume dependent. In this way, an array controller 106 that is not configured as part of the system 100 can be configured or re-configured to operate correctly with the unique WWNs 107 of the hosts 101 in the system 100. Configuring the controller to operate correctly with the logical volume 108 and with the unique storage requirements of the hosts 101 involves building a configurations data structure, and passing that data structure to the array controller through a Vendor Unique command.

We describe these logical volume configuration steps briefly. First, a user on the host computer (any of the host computers 101 connected to the controller 106) builds a configuration data structure in the hosts internal memory. (This process may also be automated based on information collected or available from other sources.) Next, the host computer transfers that configuration data structure to the array controller 106 though the Write Configuration variant of a Vendor Unique command. Controller 106 acknowledges the successful receipt of the command by returning a good SCSI status to the host in response to the Vendor Unique command. Fourth, at the completion of this Write Configuration Vendor Unique command, the array controller writes the configuration data to all of the disks (logical volumes) attached to the controller. Fifth, the host issues a Reset Controller Vendor Unique command to the array controller that causes the controller to reset and restart. Finally, at the completion of restart, the controller 106 is configured as specified by the data in the configuration structure.

The earlier description also indicated that special conditions exist when the requested access is either an "Inquiry" command, a "Vendor Unique" command, or a "Report LUNs" command, as compared to a read or write command. An Inquiry command is a command that allows the host computer to determine if any data storage space is available for a specific SCSI Logical Unit and allows the host to determine the transfer characteristics for that SCSI logical unit. It returns specific information detailing the storage capacity of a SCSI LUN, the transfer capability of the LUN, serial numbers, and other information. A Vendor Unique command is a command that allows the unique characteristics of the array controller (for example, those characteristics not defined in the SCSI or Fibre channel specifications and therefore possibly not available via standard SCSI or Fibre Channel commands or protocols) to be determined and set as well as allowing other special operations to the storage array 108. This special treatment allows a controller that is not configured to be re-configured to operate correctly with the attached hosts. Examples of Vendor Unique type commands include the Set Configuration command and the Read Configuration command for reading and setting the array controller's configuration, and the Pass Through Operation command which allows the host direct access to the disk devices attached to the controller. These commands are known in the art and not described here in greater detail, except as necessary to describe special handing related to the invention.

If the request is an Inquiry command, the array controller 106 will return conventional Inquiry Data, and will indicate whether or not that host has access to the logical unit (and hence the logical volume. If the host does not have access to the logical volume, the controller will return the Inquiry Data with the Peripheral Qualifier set as an indicator to indicate that the array is capable of supporting a device on this SCSI logical unit, but that no device is currently connected to this SCSI logical unit.

Inquiry Commands are handled in this way in part because the SCSI specification states that a SCSI LUN should always return Inquiry Data. Inquiry data is status data about the SCSI device, and has nothing to do with data stored on that device. It is an issue for the command and the host to determine if the device has any storage, and to determine what the device is capable of, for example, how fast it can transfer data. The SCSI protocol runs on top of the Fibre channel layer, so this description is applicable to both parallel SCSI and Fibre channel implementations of the invention. Where conformity with the SCSI specification is not required, alternative procedures may be substituted.

Finally, if the request is a "Report LUNs" command, and the addressed LUN is 0 (LUN=0 is required by the SCSI specification), then the controller completes the command normally, reporting only the LUNs accessible by the host requesting the command. A Report LUNs command returns information that details which SCSI Logical Units are available to the host on that fibre channel at that SCSI address.

For other than Inquiry, Vendor Unique, and Report LUNs type commands, if a request is made by a host for a logical volume and the logical volume does not have permission for that host, the array controller will assert an error condition and deny access. For example, the error condition may be asserted by setting a SCSI Check Condition status for that command, and returning SCSI Sense Data with the Sense Key set to Illegal Command and the Additional Sense Code set to Logical Unit Not Supported. Check Condition, Illegal Command, Sense Data, Sense Key, Additional Sense Code, Peripheral Qualifier and Logical Unit Not Supported are standard SCSI terms and are not described further here.

In addition to these commands, Host-to-Volume Mapping (HVM) advantageously uses several particular Vendor Unique direct commands. These are referred to here as Host-to-Volume Mapping (HVM) Direct Commands. A direct command is a SCSI Vendor Unique Command that allows configuration data to be sent and received by the array controller. These Host-to-Volume Mapping (HVM) Direct Commands include: Read LUN Map, Write LUN Map, and Read Volume WWN Table.

The Read LUN Map command returns to the host, Volume Mapping information maintained by array controller 106. The host needs Volume Mapping information from the controller in order to display the current configuration of the logical volume array to the user. The mapping information is stored in the logical volume Port Mapping Table data structure defined in the configuration data of the controller. This data is stored in the non-volatile memory of the array controller 106, and preferably in special reserved areas (COD) of the disk drive as well.

In one embodiment of the invention, the Read LUN Map command is sent using Vendor Unique Direct Command opcode (20h) in the controller firmware. An exemplary command format is illustrated in Table I.

TABLE I

Exemplary Read LUN Map Vendor Unique Direct Command CDB Format.

| Byte/Bit | 7 | 6 | 5 | 4 | 3 | 2 | 1 | 0 |
|---|---|---|---|---|---|---|---|---|
| 0 | Operation Code (20h) | | | | | | | |
| 1 | LUN | | | Reserved | | | | |
| 2 | DCMD OP CODE- MDACIOCTL_READLUNMAP (D1h) | | | | | | | |
| 3 | Logical Volume Number (MSB) | | | | | | | |
| 4 | Logical Volume Number (LSB) | | | | | | | |
| 5 | Reserved | | | | | | | |
| 6 | Reserved | | | | | | | |
| 7 | Allocation Length (MSB) | | | | | | | |
| 8 | Allocation Length (LSB) | | | | | | | |
| 9 | Control Byte | | | | | | | |

In this exemplary Command Data Block (CDB) format, the LUN field contains the logical unit number of the CDB, and is ignored. The Direct Command Opcode (DCMP OP CODE) is the command to be executed, and MDACIOCTL_READLUNMAP (D1h) is the specific command value for the Read LUN Map command. The Logical Volume Number (Most Significant Bits—MSB and Least Significant Bits—LSB) specifies the device number of the Logical Volume whose information is to be reported. The Allocation Length (MSB and LSB) indicates the number of bytes the initiator has allocated for returned information. If the length is zero, no data is transferred and this is not treated as an error condition. The controller terminates the data phase when it has completed the transfer of the requested number of bytes or all returned Volume Mapping information, whichever is less. All Reserved fields and Control Byte (which is ignored here) should be 0.

Error conditions for the Read LUN Map command include standard SCSI responses for an error, including that an invalid Logical Volume number was specified. The controller will also respond to a SCSI Check Condition Status, such as will occur when a non-existent logical volume is specified in the command.

The Write LUN Map Vendor Unique Direct command allows an initiator, such as a host computer, to create or change the Host-to-Volume Mapping (HVM) information used by the controller. The Host-to-Volume Mapping (HVM) information is created when the controller is initially configured, and is changed when logical volumes are added or deleted, or when host computers are added or removed. This data format reflects the Port Mapping Table data structure. An exemplary WriteLUN Map Direct Command CDB Format is illustrated in Table II.

TABLE II

Exemplary Write LUN Map Direct Command CDB Format.

| Byte/Bit | 7 | 6 | 5 | 4 | 3 | 2 | 1 | 0 |
|---|---|---|---|---|---|---|---|---|
| 0 | | | | Operation Code (21h) | | | | |
| 1 | | LUN | | | | | Reserved | |
| 2 | | | | DCMD OP CODE-MDACIOCTL_WRITELUNMAP (D2h) | | | | |
| 3 | | | | Logical Volume Number (MSB) | | | | |
| 4 | | | | Logical Volume Number (LSB) | | | | |
| 5 | | | | Reserved | | | | |
| 6 | | | | Reserved | | | | |
| 7 | | | | Allocation Length (MSB) | | | | |
| 8 | | | | Allocation Length (LSB) | | | | |
| 9 | | | | Control Byte | | | | |

The operation code (DCMD OP CODE) field value for the write LUN map (MDACIOCTL_WRITELUNMAP) (D2h) specifies the direct command to write the LUN map. The Logical Volume Number specifies the device number of the logical device whose information is to be reported. The Allocation Length indicates the number of bytes the initiator is going to send to the controller. If the length is zero, no data is transferred and this is not treated as an error condition. All Reserved fields and Control Byte must be 0. Error conditions for the Write LUN Map include standard SCSI responses for an error, including that an invalid or non-existent Logical Volume number was specified.

The Read Volume WWN Table command returns the Volume WWN Table maintained by the controller. The data returned by this command provides a translation from a host's physical WWN to the Host Index used internally by the controller and by the Read/Write LUN Map commands. This information is necessary when the host computer constructs the information for the configuration sent during a Write LUN Map command. An exemplary CDB for Read Volume WWN Table Vendor Unique Direct Command is illustrated in Table III.

TABLE III

Exemplary CDB for Read Volume WWN Table Vendor Uniique Direct Command

| Byte/Bit | 7 | 6 | 5 | 4 | 3 | 2 | 1 | 0 |
|---|---|---|---|---|---|---|---|---|
| 0 | | | | Operation Code (22h) | | | | |
| 1 | | LUN | | | | | Reserved | |

TABLE III-continued

Exemplary CDB for Read Volume WWN Table Vendor Uniique Direct Command

| Byte/Bit | 7 | 6 | 5 | 4 | 3 | 2 | 1 | 0 |
|---|---|---|---|---|---|---|---|---|
| 2 | | | | DCMD OP CODE-READ_HOST_WWN_TABLE | | | | |
| 3 | | | | Reserved | | | | |
| 4 | | | | Reserved | | | | |
| 5 | | | | Reserved | | | | |
| 6 | | | | Reserved | | | | |
| 7 | | | | Allocation Length (MSB) | | | | |
| 8 | | | | Allocation Length (LSB) | | | | |
| 9 | | | | Control Byte | | | | |

The operation code field (DCMD OP CODE) labeled field read host WWN field (READ_HOST_WWN_TABLE) specifies the direct command to read the host WWN table. This command may be adapted to return a desired number of bytes of data per host supported. The number of bytes returned are usually determined by the particular host computer. It should be ready to accept the data the controller sends, so it needs to have enough memory space available to store the data. This may typically vary from computer to computer. For example in one embodiment of the invention, the command returns twelve bytes of data per host, while in another embodiment of the invention, the command returns 192 bytes of data per host supported, and in yet another embodiment of the invention, the firmware in which this command is implemented returns 3072 bytes of data per host supported.

External configuration programs such as GAM (Global Array Manager) or RAIDfx can use the data from the Read Volume WWN Table command to determine some limited information regarding the fibre host cabling topology. Hosts available for assignment in the HVM should be displayed by their respective WWN for fibre channel topologies. The concept of the Host Index may normally be hidden from the end-user, as the assignment of host indexes is arbitrary, with the Host Index having no fixed relation to the physical host. Once Host Indexes are assigned, they remain fixed until the configuration is cleared. A simple graphical representation of the host cabling and connection topology may optionally also be provided to the user to aid the end-user in properly determining a viable Host-to-Volume Mapping (HVM) strategy. External configuration programs may also be provided with a "probe" for attached storage through other hosts on a network to enable the configuration program to associate the actual network name of the attached hosts with their respective WWN. Translation and conversion procedures may optionally be provided for legacy systems and configurations that were implemented prior to HVM.

We now describe SCSI command support in the HVM environment and exemplary controller responses to commands in one embodiment of the invention when Host-to-Volume Mapping (HVM) is used in a standard SCSI command environment. The Host-to-Volume Mapping (HVM) feature limits access to Logical Volumes based upon the identity of the host requesting a command, and the specific command sent.

The controller always responds to a SCSI Inquiry command from any host and to any LUN with good status. If the host does not have access to the Logical Volume, the controller returns the Inquiry data with the Peripheral Qualifier set to indicate that the target is capable of supporting the specified device type on this LUN, but no device is currently connected to that LUN. If the host does have access to the Logical Volume, the controller returns its normal Inquiry data. The SCSI Report LUNs command is always supported on LUN 0, regardless of the host sending the command or the controller port the command was received on. The controller returns information only about the LUNs that the host requesting the command has access. For the SCSI Request Sense command, if a host does not have access to the addressed LUN, the controller returns sense data with the sense key set to Illegal Request and the additional sense code set to Logical Unit Not Supported. All other standard SCSI commands are terminated with Check Condition status and auto sense data containing a sense key set to Illegal Request and the additional sense code set to Logical Unit Not Supported. Where a command operates on specific Logical Volume, such commands are generally are terminated with Check Condition status if the host does not have access to the addressed Logical Volume.

By way of example but not limitation, the inventive structure and method support a variety of different multiple host configurations, including Multiple HBAs in the same NT host, Multiple NT hosts, Multiple HBAs in the same IRIX host, and Multiple hosts having mixed operating systems (for example, IRIX and NT).

The inventive structure and method may also be used in an Internet configuration or with any interconnected network of host computer systems and/or devices such as wide area networks (WANs) and storage area networks (SANs). While the external communication net increases in speed, the storage area network speed stays about 10 times faster. Furthermore, while we describe a structure and method that is based upon the WWN of a fiber channel device, other unique identifiers may be used, for example the serial number that is imbedded in certain host computer processor chips, such as the Intel Pentium III microprocessor chips. These and other identifiers may alternatively be used. As the bandwidth of external nets (WANs) becomes comparable to the storage area nets (SANs), the structures, procedures, and methods described here may be implemented for distributed storage on the Internet or on other interconnected networks of host computers, storage devices, information appliances, and the like, much in the manner that web pages on the Internet are distributed and linked.

Further, the method and system described herein above is amenable for execution on various types of executable mediums including a memory device and other mediums different than a memory device such as a random access memory. Other types of executable mediums can be used, such as but not limited to, a computer readable storage medium which can be any memory device, compact disc, hard magnetic disk, ROM, RAM, CR-ROM disc, DVD, optical media, magneto-optical media, or floppy disk.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. In a computer system having a plurality of host computers and at least one hardware device connected to said plurality of host computers, a method for controlling access to said hardware device to maintain data integrity by one of said plurality of host computers, said method comprising:

associating a locally unique identifier with each said plurality of host computers;

defining a data structure in a memory using said locally unique identifiers identifying which particular ones of said host computers may be granted access to said hardware device based on a logical configuration between said host computers and said hardware device selectably allowing one or more of said computers to access said hardware device and selectably denying access to said hardware device by other of said computers, said data structure providing a host-to-volume mapping including host computer identifiers identifying each of said plurality of computers, at least one hardware identifier identifying said at least one hardware device, and permission information for said at least one hardware device indicating for each said host computer whether access to said at least one hardware device is visible or invisible, said data structure making any particular logical volume visible to selected ones of said computers and invisible to other ones of said computers; and querying said data structure to determine if a requesting one of said computers should be granted access or be denied access to said hardware device in order to maintain data integrity.

2. The method in claim 1, wherein said data structure is defined in a memory of a memory controller controlling said hardware device.

3. The method in claim 1, wherein said hardware device comprises at least one information storage device.

4. In a computer system having a plurality of host computers and at least one hardware device connected to said plurality of computers, a method for controlling access to said hardware device to maintain data integrity by one of said plurality of computers, said method comprising:

associating a locally unique identifier with each said plurality of computers;

defining a data structure in a memory using said locally unique identifiers identifying which particular ones of said computers may be granted access to said device based on a logical configuration between said computers and said hardware device allowing one or more computers to access said hardware device and denying access to said hardware device by other of said computers, said data structure providing a configuration information that makes any particular logical volume visible to selected ones of said computers and invisible to other ones of said computers; wherein said defining a data structure in memory further comprises:

defining a host computer ID map data structure in said memory;

defining a port mapping table data structure comprising a plurality of port mapping table entries in said memory;

defining a host identifier list data structure in said memory;

defining a volume permission table data structure in said memory; and defining a volume number table data structure in said memory; and querying said data structure to determine if a requesting one of said computers should be granted access or be denied access to said hardware device in order to maintain data integrity.

5. The method in claim 4, wherein said data structure is defined in a memory of a memory controller controlling said hardware device.

6. The method in claim 5, wherein each of the locally unique identifiers comprise a World Wide Number (WWN), and further comprising:

determining whether there has been an attempt by a host to login;

when a host login attempt is detected, searching for the WWN of the host attempting the login in the host identifier list data structure;

if the WWN of the host attempting the login is found in the host identifier list data structure, the position of the host's WWN in the host identifier list data structure is a host index; but if the WWN is not found in the host identifier list data structure, the WWN of the host attempting the login is added to the end of the host identifier list data structure and that position is the host index;

placing the host index into the host computer ID map at the position indicated by the host's channel loop ID;

collecting, by the controller, information from a channel I/O processor to allow the controller to identify the correct port mapping table data structure which contains the volume permission table data structure for a logical volume for which a request by the host was targeted, said information including: the controller, the I/O Processor on which the request was made, and that logical volume;

searching, by the controller, the volume number table data structure associated with that logical volume to determine if that host attempting the login is allowed to access that logical volume; and if the WWN of the host attempting the login is found in the volume number table data structure for that logical volume, setting by the controller, the volume permission table data structure entry pointed to by the host index to a first logical state; but if the WWN of the host attempting the login is not found for that logical volume, setting the volume permission table data structure entry pointed to by host index to a second logical state.

7. The method in claim 6, further comprising:

waiting, by the controller, for a host access request to be received;

determining, upon receipt of a host access request by the controller, the command type;

if the command type is an I/O command type, the controller determines the identity of the controller in which the command was received, the host port of the command, and the LUN and corresponding logical volume to which the command is addressed;

locating, the proper port mapping table data structure based on the identity of the controller, the host port I/O processor, and the logical volume;

identifying the host index in the host computer ID map based on a target ID of the command;

examining, by the controller, the volume permission table data structure at the position pointed to by the Host Index of the command to determine if the volume permission table data structure entry pointed to by the Host Index stores a entry having the first logical state or the second logical state; and if the volume permission table data structure entry has a first logical state, permitting access to the logical volume and processing the command by the controller normally; and if the volume permission table data structure entry has the second logical value then denying access to the logical volume and responding to the command with an error indication.

8. The method in claim 7, wherein the host identifier list data structure comprises the host WWN list.

9. The method in claim 7, wherein the method includes a procedure that implements predetermined rules in a policy so that:

(i) a logical volume maps to a single logical unit number only on a specific host port;

(ii) a logical volume maps to the same logical unit number for all hosts that are granted access to the logical device in the volume permission table or host index bit map;

(iii) a logical volume may map to different logical unit numbers on a different controller or different host port; and (iv) multiple logical volumes may map to any logical unit number on a single host port provided that there is no overlap of the volume permission table or host index bit map for the logical devices.

10. The method in claim 4, wherein said computer identifier comprises a world wide number identifier.

11. The method in claim 4, wherein said hardware device comprises at least one hard disk drive storage device configured as a logical volume.

12. The method in claim 4, wherein said hardware device comprises a RAID storage system and said controller comprises a RAID array controller.

13. The method in claim 4, wherein the method includes a procedure that implements predetermined rules in a policy so that:

(i) a logical volume maps to a single logical unit number only on a specific host port;

(ii) a logical volume maps to the same logical unit number for all hosts that are granted access to the logical device in the volume permission table or host index bit map;

(iii) a logical volume may map to different logical unit numbers on a different controller or different host port; and (iv) multiple logical volumes may map to any logical unit number on a single host port provided that there is no overlap of the volume permission table or host index bit map for the logical devices.

14. An interconnected network of computers comprising:

at least one shared hardware device;

a plurality of host computers coupled to said hardware device by a communications channel and having a locally unique node identifier;

a controller coupled between said plurality of host computers and said at least one shared hardware device and controlling access to said hardware device by said host computers; and a data structure defined in a memory of said controller and comprising: (i) a host computer ID map data structure; (ii) a port mapping table data structure comprising a plurality of port mapping table entries; (iii) a host identifier list data structure in said memory; (iv) a volume permission table data structure; and (v) a volume number table data structure;

said data structure identifying which particular ones of said computers may be granted access to said shared hardware device based on a logical configuration between said computers and said hardware device allowing one or more computers to access said hardware device and denying access to said hardware device by other of said computers, said data structure providing a configuration information that makes any particular hardware device visible to selected ones of said computers and invisible to other ones of said computers.

15. The interconnected network of computers in claim 14, wherein said at least one shared hardware device comprises an information storage device.

16. The interconnected network of computers in claim 14, wherein said at least one shared hardware device comprises a logical volume of a disk drive storage subsystem.

17. The interconnected network of computers in claim 14, wherein said communications channel comprises a fibre channel arbitrated loop communications channel.

18. The interconnected network of computers in claim 14, wherein said locally unique node identifier comprises a world wide number (WWN) identifier.

19. The interconnected network of computers in claim 14, wherein said hardware device comprises a Storage Area Network.

20. The interconnected network of computers in claim 14, wherein:

said at least one shared hardware device comprises a logical volume of a disk drive storage subsystem;

said communications channel comprises a fibre channel arbitrated loop communications channel; and said locally unique node identifier comprises a world wide number (WWN) identifier.

21. A controller for controlling access to at least one shared hardware device that is coupled with a plurality of host computers by a communications channel and having a locally unique node identifier, said controller comprising:

a processor;

a memory coupled to said processor and storing instructions for processing input/output operations with said hardware device and defining a data structure;

said data structure comprising: (i) a host computer ID map data structure; (ii) a port mapping table data structure comprising a plurality of port mapping table entries; (iii) a host identifier list data structure; (iv) a volume permission table data structure; and (v) a volume number table data structure; and said data structure identifying which particular ones of said computers may be granted access to said shared hardware device based on a logical configuration between said computers and said hardware device allowing one or more computers to access said hardware device and denying access to said hardware device by other of said computers, said data structure providing a configuration information that makes any particular hardware device visible to selected ones of said computers and invisible to other ones of said computers.

22. The controller in claim 21, wherein said at least one shared hardware device comprises an information storage device.

23. The controller in claim 21, wherein said at least one shared hardware device comprises a logical volume of a disk drive storage subsystem.

24. The controller in claim 21, wherein said communications channel comprises a fibre channel arbitrated loop communications channel.

25. The controller in claim 21, wherein said locally unique node identifier comprises a world wide number (WWN) identifier.

26. The controller in claim 21, wherein said hardware device comprises a Storage Area Network.

27. The controller in claim 21, wherein:

said at least one shared hardware device comprises a logical volume of a disk drive storage subsystem;

said communications channel comprises a fibre channel arbitrated loop communications channel; and said locally unique node identifier comprises a world wide number (WWN) identifier.

28. The controller in claim 21, wherein said instructions include instructions for:

associating a locally unique identifier with each said plurality of computers;

defining a data structure in said memory identifying which particular ones of said computers based on said locally unique identifier may be granted access to said device; and querying said data structure to determine if a requesting one of said computers should be granted access to said hardware device.

29. The controller in claim 28, wherein said instructions further include instructions for:

defining a host computer ID map data structure in said memory;

defining a port mapping table data structure comprising a plurality of port mapping table entries in said memory;

defining a host identifier list data structure in said memory;

defining a volume permission table data structure in said memory; and defining a volume number table data structure in said memory.

30. A computer program product for use in conjunction with a computer system having a plurality of host computers and at least one shared hardware device, the computer program product comprising a computer readable storage medium and a computer program mechanism embedded therein, the computer program mechanism comprising:

a program module for controlling access to said shared hardware device by one of said plurality of host computers; the program module including instructions for:

associating a locally unique identifier with each said plurality of host computers;

defining a data structure in a memory using said locally unique identifiers identifying which particular ones of said host computers may be granted access to said hardware device based on a logical configuration between said host computers and said hardware device selectably allowing one or more of said computers to access said hardware device and selectably denying access to said hardware device by other of said computers, said data structure providing a host-to-volume mapping including host computer identifiers identifying each of said plurality of computers, at least one hardware identifier identifying said at least one hardware device, and permission information for said at least one hardware device indicating for each said host computer whether access to said at least one hardware device is visible or invisible, said data structure making any particular logical volume visible to selected ones of said computers and invisible to other ones of said computers; and querying said data structure to determine if a requesting one of said computers should be granted access or be denied access to said hardware device in order to maintain data integrity.

31. The computer program product of claim 30, wherein said program module further including instructions for:

querying said data structures to determine whether access to said hardware device is permitted.

32. The computer program product of claim 30, wherein said hardware device comprises a Storage Area Network.

33. A computer program product for use in conjunction with a computer system having a plurality of host computers and at least one shared hardware device, the computer program product comprising a computer readable storage medium and a computer program mechanism embedded therein, the computer program mechanism comprising:

a program module for controlling access to said shared hardware device by one of said plurality of host computers; the program module including instructions for:

associating a locally unique identifier including a world wide number (WWN) with each said plurality of computers;

defining a data structure in a memory of a controller controlling said at least one shared hardware device, wherein defining comprises using said locally unique identifiers identifying which particular ones of said computers may be granted access to said device based on a logical configuration between said computers and said hardware device allowing one or more computers to access said hardware device and denying access to said hardware device by other of said computers, said data structure providing a configuration information that makes any particular logical volume visible to selected ones of said computers and invisible to other ones of said computers;

querying said data structure to determine if a requesting one of said computers should be granted access or be denied access to said hardware device in order to maintain data integrity;

determining whether there has been an attempt by a host to login;

when a host login attempt is detected, searching for the WWN of the host attempting the login in the host identifier list data structure;

if the WWN of the host attempting the login is found in the host identifier list data structure, the position of the host's WWN in the host identifier list data structure is a host index; but if the WWN is not found in the host identifier list data structure, the WWN of the host attempting the login is added to the end of the host identifier list data structure and that position is the host index;

placing the host index into the host computer ID map at the position indicated by the host's channel loop ID;

collecting, by the controller, information from a channel I/O processor to allow the controller to identify the correct port mapping table data structure which contains the volume permission table data structure for a logical volume for which a request by the host was targeted, said information including: the controller, the I/O Processor on which the request was made, and that logical volume;

searching, by the controller, the volume number table data structure associated with that logical volume to determine if that host attempting the login is allowed to access that logical volume; and if the WWN of the host attempting the login is found in the volume number table data structure for that logical volume, setting by the controller, the volume permission table data structure entry pointed to by the host index to a first logical state; but if the WWN of the host attempting the login is not found for that logical volume, setting the volume permission table data structure entry pointed to by host index to a second logical state.

34. The method in claim 33, further comprising:

waiting, by the controller, for a host access request to be received;

determining, upon receipt of a host access request by the controller, the command type;

if the command type is an I/O command type, the controller determines the identity of the controller in which the command was received, the host port of the command, and the LUN and corresponding logical volume to which the command is addressed;

locating, the proper port mapping table data structure based on the identity of the controller, the host port I/O processor, and the logical volume;

identifying the host index in the host computer ID map based on a target ID of the command;

examining, by the controller, the volume permission table data structure at the position pointed to by the Host Index of the command to determine if the volume permission table data structure entry pointed to by the Host Index stores a entry having the first logical state or the second logical state; and if the volume permission table data structure entry has a first logical state, permitting access to the logical volume and processing the command by the controller normally; and if the volume permission table data structure entry has the second logical value then denying access to the logical volume and responding to the command with an error indication.

35. In a computer system having a plurality of host computers and at least one hardware device connected to said plurality of computers, a method for controlling access to said hardware device by one of said plurality of computers, said method comprising:

associating a locally unique identifier including a world wide number (WWN) with each said plurality of computers;

defining a data structure in a memory of a controller controlling said hardware device, wherein defining comprises using said locally unique identifiers identifying which particular ones of said computers may be granted access to said device based on a logical configuration between said computers and said hardware device allowing one or more computers to access said hardware device;

said data structure comprising: (i) defining a host computer ID map data structure in said memory, (ii) defining a port mapping table data structure comprising a plurality of port mapping table entries, (iii) defining a host identifier list data structure, (iv) defining a volume permission table data structure, and (v) defining a volume number table;

determining whether there has been a request by a host to login;

querying said data structure to determine if a requesting one of said host computers should be granted access to said hardware device;

said defining of said data structure and said querying of said data structure further including:

when a host login attempt is detected, searching for the WWN of the host attempting the login in the host identifier list data structure;

if the WWN of the host attempting the login is found in the host identifier list data structure, the position of the host's WWN in the host identifier list data structure is a host index; but if the WWN is not found in the host identifier list data structure, the WWN of the host attempting the login is added to the end of the host identifier list data structure and that position is the host index;

placing the host index into the host computer ID map at the position indicated by the host's channel loop ID;

collecting, by the controller, information from a channel I/O processor to allow the controller to identify the correct port mapping table data structure which contains the volume permission table data structure for a logical volume for which a request by the host was targeted, said information including: the controller, the I/O Processor on which the request was made, and that logical volume;

searching, by the controller, the volume number table data structure associated with that logical volume to determine if that host attempting the login is allowed to access that logical volume; and if the WWN of the host attempting the login is found in the volume number table data structure for that logical volume, setting by the controller, the volume permission table data structure entry pointed to by the host index to a first logical state; but if the WWN of the host attempting the login is not found for that logical volume, setting the volume permission table data structure entry pointed to by host index to a second logical state.

36. The method in claim 35, further comprising:

waiting, by the controller, for a host access request to be received;

determining, upon receipt of a host access request by the controller, the command type;

if the command type is an I/O command type, the controller determines the identity of the controller in which the command was received, the host port of the command, and the LUN and corresponding logical volume to which the command is addressed;

locating, the proper port mapping table data structure based on the identity of the controller, the host port I/O processor, and the logical volume;

identifying the host index in the host computer ID map based on a target ID of the command;

examining, by the controller, the volume permission table data structure at the position pointed to by the host index of the command to determine if the volume permission table data structure entry pointed to by the host index stores a entry having the first logical state or the second logical state; and if the volume permission table data structure entry has a first logical state, permitting access to the logical volume and processing the command by the controller normally; and if the volume permission table data structure entry has the second logical value then denying access to the logical volume and responding to the command with an error indication.

37. The method in claim 36, wherein the method reduces the number of required searches by building the volume permission table data structure associated with each logical volume at login; and by defining the data structure such that only a single logical element of the data structure is examined before access privileges can be verified and a read or write operation scheduled.

38. A computer program product for use in conjunction with a computer system having a plurality of host computers and at least one shared hardware device, the computer program product comprising a computer readable storage medium and a computer program mechanism embedded therein, the computer program mechanism comprising:

a program module for controlling access to said shared hardware device by one of said plurality of host computers; the program module including instructions for:

associating a locally unique identifier with each said plurality of computers;

defining a data structure in a memory using said locally unique identifiers identifying which particular ones of said computers may be granted access to said device based on a logical configuration between said computers and said hardware device allowing one or more computers to access said hardware device and denying access to said hardware device by other of said computers, said data structure providing a configuration information that makes any particular logical volume visible to selected ones of said computers and invisible to other ones of said computers;

defining a host computer ID map data structure in a memory;

defining a port mapping table data structure comprising a plurality of port mapping table entries in said memory;

defining a host identifier list data structure in said memory;

defining a volume permission table data structure in said memory; and defining a volume number table data structure in said memory; and querying said data structure to determine if a requesting one of said computers should be granted access or be denied access to said hardware device in order to maintain data integrity.

* * * * *